(12) United States Patent
Chen et al.

(10) Patent No.: US 10,329,900 B2
(45) Date of Patent: Jun. 25, 2019

(54) SYSTEMS AND METHODS EMPLOYING COOPERATIVE OPTIMIZATION-BASED DIMENSIONALITY REDUCTION

(71) Applicant: Halliburton Energy Services, Inc., Houston, TX (US)

(72) Inventors: Dingding Chen, Plano, TX (US); Syed Hamid, Dallas, TX (US); Michael C. Dix, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/348,718

(22) Filed: Nov. 10, 2016

(65) Prior Publication Data

US 2017/0058666 A1   Mar. 2, 2017

Related U.S. Application Data

(62) Division of application No. 12/190,418, filed on Aug. 12, 2008, now Pat. No. 9,514,388.

(60) Provisional application No. 61/086,522, filed on Aug. 6, 2008.

(51) Int. Cl.
| | | |
|---|---|---|
| *G06N 3/08* | (2006.01) | |
| *E21B 47/12* | (2012.01) | |
| *G06K 9/62* | (2006.01) | |
| *E21B 49/08* | (2006.01) | |
| *G06N 3/00* | (2006.01) | |
| *G06N 3/04* | (2006.01) | |

(52) U.S. Cl.
CPC .............. *E21B 47/12* (2013.01); *E21B 49/08* (2013.01); *G06K 9/6229* (2013.01); *G06K 9/6248* (2013.01); *G06N 3/006* (2013.01); *G06N 3/0454* (2013.01); *G06N 3/08* (2013.01); *G06N 3/086* (2013.01); *E21B 2049/085* (2013.01)

(58) Field of Classification Search
None
See application file for complete search history.

(56) References Cited

U.S. PATENT DOCUMENTS 7,039,621 B2 * 5/2006 Agrafiotis ............ G06K 9/6232
706/15

OTHER PUBLICATIONS

Maulik, Ujjwal, and Sanghamitra Bandyopadhyay. "Genetic algorithm-based clustering technique." Pattern recognition 33.9 (2000): 1455-1465.*

* cited by examiner

*Primary Examiner* — Li B. Zhen
*Assistant Examiner* — Daniel T Pellett
(74) *Attorney, Agent, or Firm* — Alan Bryson; Parker Justiss, P.C.

(57) ABSTRACT

Dimensionality reduction systems and methods facilitate visualization, understanding, and interpretation of high-dimensionality data sets, so long as the essential information of the data set is preserved during the dimensionality reduction process. In some of the disclosed embodiments, dimensionality reduction is accomplished using clustering, evolutionary computation of low-dimensionality coordinates for cluster kernels, particle swarm optimization of kernel positions, and training of neural networks based on the kernel mapping. The fitness function chosen for the evolutionary computation and particle swarm optimization is designed to preserve kernel distances and any other information deemed useful to the current application of the disclosed techniques, such as linear correlation with a variable that is to be predicted from future measurements. Various error measures are suitable and can be used.

10 Claims, 19 Drawing Sheets

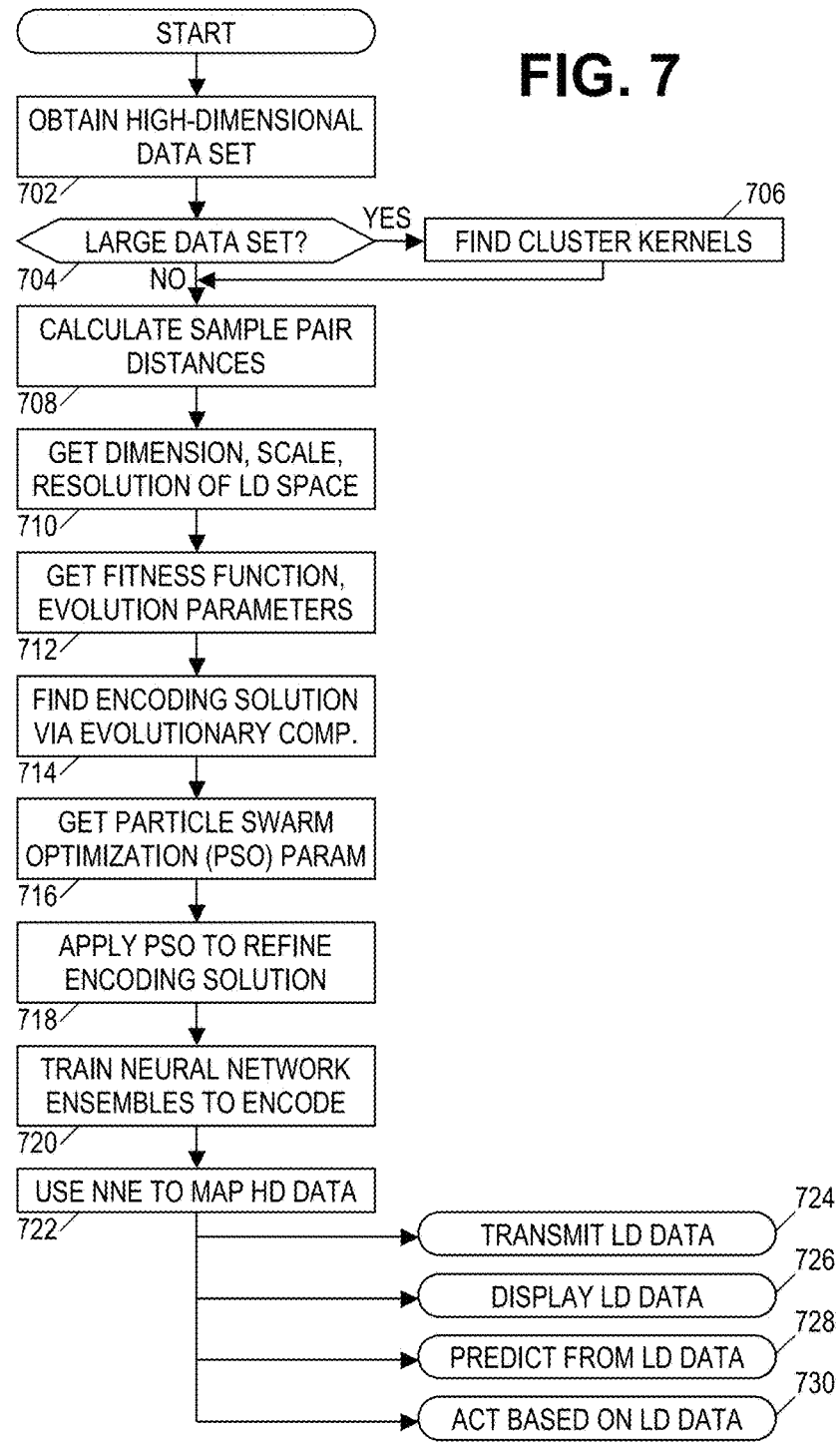

SYSTEMS AND METHODS EMPLOYING COOPERATIVE OPTIMIZATION-BASED DIMENSIONALITY REDUCTION

RELATED APPLICATIONS

This application is a divisional of co-pending U.S. application Ser. No. 12/190,418, filed Aug. 12, 2008, which is now U.S. Pat. No. 9,514,388, which claims the benefit of U.S. Provisional Application No. 61/086,522, filed Aug. 6, 2008, both of which are incorporated by reference in their entireties.

BACKGROUND

Many applications such as oilfield logging require analysis of many independent data parameters. The measurements can be treated as points in a multi-dimensional data space—an approach that is often convenient mathematically, but extremely difficult for humans to visualize or analyze effectively. Nevertheless, such visualization usually offers insight into the nature of the data, thereby facilitating subsequent use of the data set for interpretation and modeling.

Techniques exist for translating a set of data points having many dimensions (i.e., a "high-dimensionality data set") into a set of data points having a smaller number of dimensions (i.e., a "low-dimensionality data set"). The number of dimensions for the low-dimensionality data set is often chosen in the range of two to four to enable straightforward visualization of the data. A review on high-dimension data visualization and data dimension reduction can be found in the paper, "DD-HDS: A method for visualization and exploration of high-dimensional data", by Lespinats et al., IEEE Transactions on Neural Networks, vol. 18, no. 5, pp: 1265-1279, September 2007, which is hereby incorporated herein by reference.

Generally speaking, it is desirable to preserve as much as possible the difference, or "distance", between pairs of data points. Thus, for example, data points that are closely spaced in the high-dimensionality data set should be closely spaced in the low-dimensionality data set, and data points that are widely spaced in the high-dimensionality data set should be widely spaced in the low dimensionality data set. Such preservation of the sample pair distances is believed to preserve the "essential" information contained by the data set.

Since conventional linear mapping methods such as principal component analysis (PCA) do not preserve such distance-based essential information in a satisfactory way, dimensionality reduction is often treated as a non-linear optimization problem. J. W. Sammon, in "A Nonlinear Mapping for Data Structure Analysis", IEEE Trans. Comput. C-18 (5): 401-409, 1969, introduces the use of an objective function (termed a "stress function" by Sammon) to minimize the mismatch of sample-pair distance between the original and transformed data. P. Demartines J. Herault, in "Curvilinear Component Analysis: A Self-Organizing Neural Network for Nonlinear Mapping of Data Sets", IEEE Trans. Neural Networks 8 (1): 148-154, 1997, implicitly use a gradient-based approach to implement their neural-network based dimensionality reduction. In "Graph Drawing by Force-Directed Placement", Software: Practice and Experience 21 (11): 1129-1164, 1991, T. Fruchterman and E. Reingold adopt the concept of the spring-mass system to adjust and stabilize the low-dimensionality data positions.

M. Raymer et al, in "Dimensionality Reduction Using Genetic Algorithms", IEEE Transactions on Evolutionary Computation 4 (2): 164-171, 2000, focus on feature selection, feature extraction, and classifier training, to construct a linear transformation matrix that can then be tuned using evolutionary computation. C. Yang et al, in "Dimensionality Reduction Using GA-PSO", Proc. 9th Joint Conference on Information Sciences, Taiwan, 2006, focus on the feature selection aspect of Raymer with a combined GA-PSO (Genetic Algorithm—Particle Swarm Optimization) approach. It should be noted that Yang integrates PSO into his genetic algorithm using an N-nearest neighbor distance match, and he applies it to each generation.

The foregoing techniques fail to effectively minimize the information loss associated with dimensionality reduction.

BRIEF DESCRIPTION OF THE DRAWINGS

In the following detailed description, reference will be made to the accompanying drawings, in which:

FIG. 7 is a flow diagram of an illustrative method employing dimensionality reduction;

Figure 1:
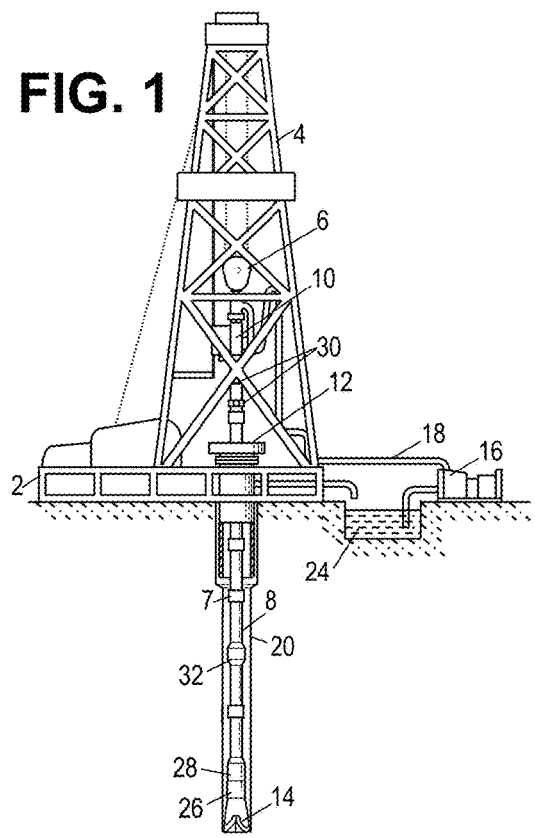
FIG. 1 shows an illustrative logging while drilling (LWD) environment.

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ".

The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

In the context of dimensionality reduction, this document variously uses the terms "original", "high-dimensionality", and "HD" as modifiers to indicate the data set being accepted as input for the dimensionality reduction process. Similarly the terms "output", "low-dimensionality", "LD", "reduced", and "compressed" are used as modifiers to indicate the data set resulting from the dimensionality reduction process and/or the data space destined to contain the resulting data set.

The term "sample point" as used herein refers generically to either a data point from the HD data set or a kernel point that represents a cluster in the HD data set. The term "coding" as used herein refers to a coordinate of a point in the reduced dimensionality data space.

DETAILED DESCRIPTION

Accordingly, there are disclosed herein systems and methods to help determine the best data transformation of a high-dimensionality ("HD") data set to a low-dimensionality ("LD") data space with minimal information loss. The disclosed systems and methods employ a hybrid approach in which an optional clustering phase is followed by an evolutionary computation ("EC") phase that directly determines near-optimal LD locations for each of the HD sample points. A particle-swarm optimization (PSO) phase may then be used to refine the EC phase coding. The set of HD sample points, along with the corresponding LD encodings, can then be used to train a neural network (or a neural network ensemble) to implement a general transform from the HD data space to the LD data space. This approach enables a user to embed a multi-objective fitness function to preserve the aspects of the data set that the user considers to be essential. Thus, e.g., the user can maximize the distance matching in the relevant data spaces while retaining the correlation of the LD data set with user-selected external parameters. Such correlations enable predictive modeling or feature extraction in the LD data space. This hybrid approach is expected to fully address the local minima issue while enabling robust conversion of any newly acquired data.

Potential applications of the disclosed systems and methods include: data visualization, data transmission, and predictive modeling. With respect to data visualization, the disclosed systems and methods can be used to automate high dimensionality data processing for many logging, drilling and petrophysical/geophysical applications by displaying essential information in a vision-friendly low-dimensionality space. Particular illustrative applications include multi-well cluster merging/splitting, facies identification, lithotyping, stratigraphic classification and characterization, and reservoir quality determination. As dimensionality reduction also eases the tasks of many clustering algorithms, the disclosed methods can better exploit clustering to further improve the visual presentation of the data set.

With respect to data transmission, we note that efficient data transmission from the downhole to the surface is desirable in diverse drilling operations to adjust steering mode and facilitate real-time applications. Since too many variables affect well path, high-ratio downhole data compression is critical to overcome the limitation of the existing logging/drilling tools and well telemetry systems. The disclosed systems and methods will effectively reduce the load of transmission system by transmitting dimension-reduced data only with minimal information loss. On a related note, the data set is expected to be more readily accessible in the reduced data space, enabling computational cost reductions when processing the data set.

With respect to predictive modeling, we note that input selection is often a problem for predictive modeling, especially if the candidate dimensionality is high. Some commercially available services (such as LaserStrat from Sperry Drilling Services) offer rock elemental data with more than 40 measurements for each sample. As another example, the primary and secondary measurements of pulsed-neutron logging tools have more than 30 variables. Even routine logging suites typically offer in excess of 12 independent measurements. The abundance of available input variables potentially improves data analysis, but requires significant effort to integrate the data in a manner that provides information specific to different applications. The disclosed systems and methods provide an alternative, enabling the use of the LD data as general inputs. We will show in the later section that quality prediction in formation density can still be obtained from reduced dimensionality pulsed neutron data.

Illustrative Context

The disclosed systems and methods are best understood in the context of some of their potential applications. Accordingly, FIG. 1 shows an illustrative logging while drilling (LWD) environment. A drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

The drill bit 14 is just one piece of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. An azimuthally sensitive tool 26 (such as a pulsed neutron logging tool, a gamma ray logging tool, an acoustic logging tool, or a resistivity logging tool) may be integrated into the bottom-hole assembly near the bit 14. As the bit extends the borehole through the formations, tool 26 rotates and collects azimuthally-sensitive formation property measurements that a downhole controller associates with tool position and orientation measurements to form a three-dimensionality image map of the borehole wall. The measurements can be stored in internal memory and/or communicated to the surface. A telemetry sub 28 may be included in the bottom-hole assembly to maintain a communications link with the surface. Mud pulse telemetry is one common telemetry technique for transferring tool measurements to surface receivers 30 and receiving commands from the surface, but other telemetry techniques can also be used.

Figure 2:
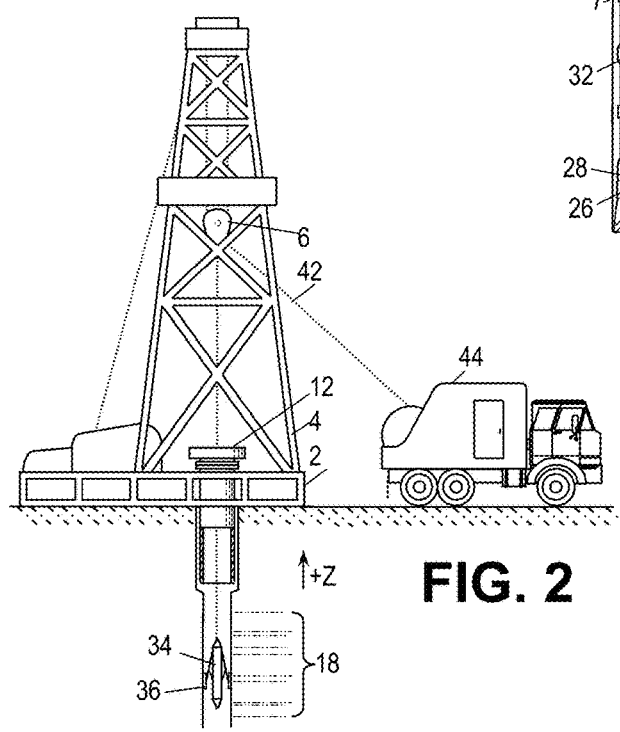
FIG. 2 shows an illustrative wireline logging environment.

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. Other formation property sensors can additionally or alternatively be included. A logging facility 44 collects measurements from the logging tool 34, and includes computing facilities for processing and storing the measurements gathered by the logging tool.

Figure 3:
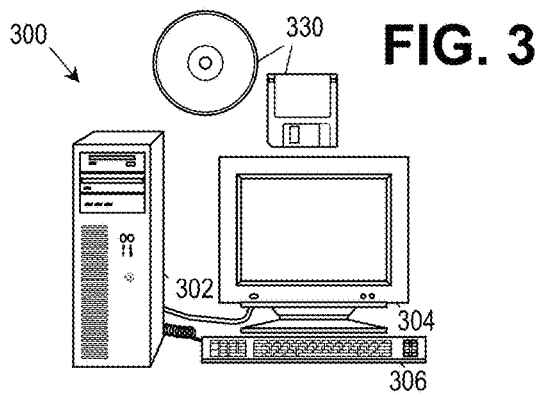
FIG. 3 is a perspective view of an illustrative system employing dimensionality reduction.

FIG. 3 is a perspective view of an illustrative computerized system 300 employing dimensionality reduction. A computer chassis 302 is coupled to a display 304 and one or more input devices 306. Illustrative removable information storage media 330 are also shown. The display 304 and the input devices 306 cooperate to function as a user interface to enable the user to map a high dimensionality data set into a low dimensionality data set for visualization and/or for analysis in the low dimensionality data space.

Figure 4:
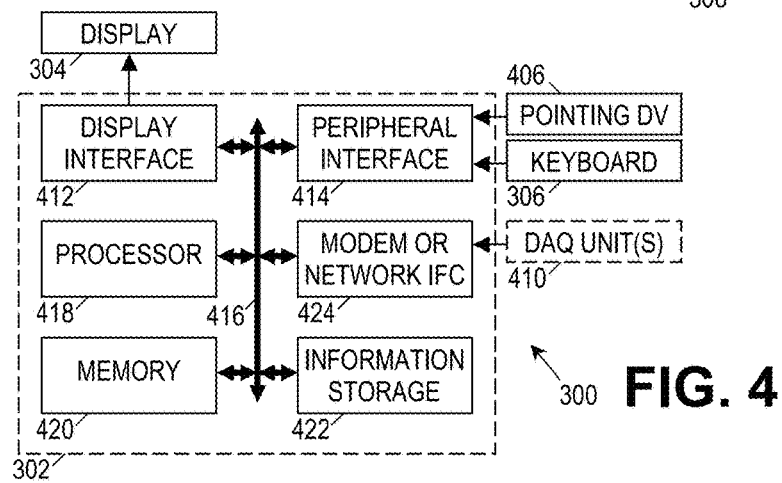
FIG. 4 is a block diagram of an illustrative system employing dimensionality reduction.

A block diagram of the illustrative system 300 is shown in FIG. 4. FIG. 4 shows that, in addition to a display 304 and keyboard 306, a pointing device 406 and a data acquisition unit 410 may be coupled to the computer chassis 302. Keyboard 306 and pointing device 406 are just two examples of the many suitable input devices available to the user for guiding the system's operation in response to information provided on display 304. Data acquisition unit 410 serves as an optional way to acquire high-dimensionality telemetry data from a logging tool or other source.

Located in the chassis 302 is a display interface 412, a peripheral interface 414, a bus 416, a processor 418, a memory 420, an information storage device 422, and a network interface 424. The display interface 412 may take the form of a video card or other suitable interface that accepts information from the bus 416 and transforms it into a form suitable for display 404. Conversely, the peripheral interface 414 may accept signals from input devices 306, 406 and transform them into a form suitable for communication on bus 416. Bus 416 interconnects the various elements of the computer and transports their communications.

Processor 418 gathers information from the other system elements, including input data from the peripheral interface 414 and program instructions and other data from the memory 420, the information storage device 412, or from an external location via the network interface 424. (The network interface 424 enables the processor 418 to communicate with remote systems via a wired or wireless network.) The processor 418 carries out the program instructions and processes the data accordingly. The program instructions may further configure the processor 418 to send data to other system elements, including information for the user, which may be communicated via the display interface 412 and the display 304.

The processor 418, and hence the computer as a whole, generally operates in accordance with one or more programs stored on an information storage device 422. One or more of the information storage devices may store programs and data on removable storage media such as a floppy disk or an optical disc 330 (FIG. 3). Whether or not the information storage media is removable, the processor 418 may copy portions of the programs into the memory 420 for faster access, and may switch between programs or carry out additional programs in response to user actuation of the input device. One or more of these programs configures the computer to carry out at least one of the dimensionality reduction methods disclosed herein.

Stated in another fashion, the methods described herein can be implemented in the form of software that can be communicated to a computer or another processing system on an information storage medium such as an optical disk, a magnetic disk, a flash memory, or other persistent storage device. Alternatively, such software may be communicated to the computer or processing system via a network or other information transport medium. The software may be provided in various forms, including interpretable "source code" form and executable "compiled" form. The various operations carried out by the software as described herein may be written as individual functional modules (e.g., "objects", functions, or subroutines) within the source code.

Illustrative Methods

The methods disclosed herein can generally be broken down into four sequential phases, some of which may be optional for transforming some high-dimensionality data sets. The four phases are: clustering, evolutionary computation (EC), particle swarm optimization (PSO), and generalization. The EC and PSO phases are now discussed in detail in preparation for the description of the overall method.

The task of the EC phase is to construct a set of points in a reduced dimensionality data space that maximize a set of optimization criteria. For data visualization, the number of dimensions in the low dimensionality data space might typically be 2 or 3. If the original data set is not too large (e.g., smaller than about 400), each EC chromosome has one low-dimensionality position encoding for each data point. If the data set is too large, then a clustering phase is applied to identify the data set's high-dimensionality cluster kernels, and each EC chromosome has one low-dimensionality position encoding for each kernel. The design decision for the EC chromosomes also includes the range and resolution of each dimension in the low dimensionality data space. It is noted that the low dimensionality coordinates can be specified using Gray coding to ensure that small changes in position do not require a disproportionate number of bit transitions. An illustrative chromosome for 300 samples in a 3D low-dimensionality data space with 12 bit resolution is 10800 bits long.

Since the EC phase is determining LD coordinates encoded in a long binary string, the chances of being trapped in a local minimum are high. To better tackle this problem, we divide the EC optimization process into two stages. In the first stage, the basic genetic algorithm is applied to the whole chromosome ("global search"), and each generation is derived solely from the initial population. This stage enables us to quickly reduce the mapping error. In the second stage, the chromosome (which is, after all, a group of genes) is divided into subgroups. The genes outside the selected subgroup are frozen and evolution is performed while only allowing changes within the selected subgroup (sometimes termed a "local search"). In this stage, each generation can be augmented with a secondary population generated by applying random variations to the selected subgroup.

Figure 6:
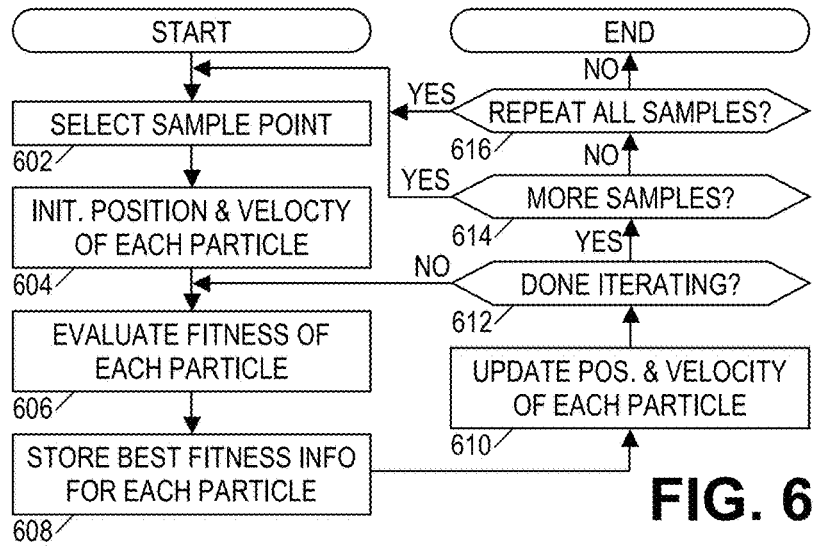
FIG. 6 is a flow diagram of an illustrative particle-swarm optimization phase.

A flow diagram for the EC phase is shown in FIG. 6. Beginning in block 502, the system 300 generates a population of chromosomes having randomly encoded LD coordinates for each sample. In block 504, the system determines the distances between each pair in the LD data space. In block 506 a fitness function determines a measure of how well the distances in the LD and HD data spaces match, and the chromosomes are ranked accordingly. Fitness functions are discussed in more detail further below, but for now it is sufficient to note that some embodiments include calculations of mean square error between inter-sample distances in the HD and LD data spaces.

In block 508, the "fittest" chromosomes are selected for survival and participation in generating new chromosomes via crossover pairing and mutation. In block 510, the system determines whether blocks 504-508 should be repeated with the new generation. This determination can be based on reaching a threshold fitness level or exceeding a predetermined number of iterations. Blocks 502-510 represent the "global search" stage of the EC phase. In block 512, the system determines whether a "local search" is desirable. As before, this determination can be based on reaching a threshold fitness level or reaching a predetermined number of iterations. If no further local searching is needed, the EC phase terminates.

Blocks 514-524 represent the "local search" stage of the EC phase. In block 514, the system selects a subgroup. The mutually exclusive subgroups each include a whole number of LC encodings, but these encodings need not be adjacent on the chromosome. We note here that the subgroups can be randomly re-determined each time the local search stage is begun, but once determined they are held fixed until each subgroup has been processed.

In block 516, a secondary population of chromosomes is to augment the primary population. The secondary population is generated by taking chromosomes from the primary and replacing the selected subgroup with randomly generated encodings. In block 518 the system measures the distances between LD sample pairs for each chromosome in both the primary and secondary populations. In block 520, these sample pair distances are used to determine the fitness of each chromosome and rank the chromosomes accordingly. In block 522, the population is updated by selection, crossover, and mutation. Again, the crossover and mutation are limited to the selected subgroup. In block 524, the system determines whether each of the subgroups has been processed. If not, then blocks 514-522 are repeated for the next selected subgroup. Otherwise the local search stage terminates and the system returns to block 504.

Now we turn to a discussion of the particle swarm optimization (PSO) phase. The LD encodings generated by the EC phase are potentially impaired due to the range and resolution limits imposed by the chromosome design process. With the PSO phase, we remove these limits by using floating-point numbers. PSO is a population-based stochastic optimization technique. In PSO, each single candidate solution can be considered as an individual bird of a flock. The particles move through the problem space by following a current of optimum particles, and the less-fit particles do not die.

FIG. 6 shows a flow diagram of the PSO phase, taking the best LD encoding result from the EC phase as the initial condition. The number of tuning cycles, number of particles, number of iterations, and update equations are other predetermined parameters employed during the PSO phase. Beginning in block 602, system selects one of the sample points. To speed convergence, the system can order the samples according to distance mismatch, starting with the largest. In subsequent cycles, the samples can be ordered according to the previous cycle's change in LD position, again starting of the largest.

In block 604, the system determines the initial position and velocity of each particle in the LD space. The initial positions can be specified as randomly distributed offsets from the LD position of the selected sample. Velocities are also randomly generated. In block 606 the fitness function is evaluated for each particle, or at least that portion of the fitness function that is affected by adjusting the LD position of the sample to the current particle position. In block 608, the fitness value for each particle is compared to previous "best" values (if any) to identify and store the best positions encountered by each of the particles. An individual best position is stored for each particle, as well as a global best position in block.

In block 610, the system updates the current position and velocity of each particle. In some embodiments, the following update equations are used:

$$V(t+1) = IW(t) \times V(t) + C_1 \times \text{rand} \times (P - X(t)) + C_2 \times \text{rand} \times (Pg - X(t))$$

$$X(t+1) = X(t) + V(t+1)$$

where $V(t)$ is the velocity, $IW(t)$ is the inertia weight which decreases over time (e.g. from 0.9 to 0.4), $C_1$ and $C_2$ are constants chosen to tailor the sensitivity of the particle's motion to its distance from the individual and global best positions (e.g., chosen in the range 1.4 to 2.0), rand is a randomly generated value between zero and one (with a uniform distribution), P is the individual best position of the particle, Pg is the global best position of the particle swarm, and $X(t)$ is the current position of the particle.

In block 612, the system determines whether the desired number of particle position updates have been performed, and if not, blocks 606-610 are repeated. Otherwise, the sample's LD position is updated if the particle swarm identified a better position, and in block 614, the system determines whether each of the sample points have been processed in the current cycle. If not, blocks 602-612 are performed for the next sample. Otherwise, the system determines whether the desired number of optimization cycles have been performed. If not, blocks 602-614 are repeated until the desired number of cycles has been reached and the PSO phase terminates.

Using a hybrid EC/PSO process is expedient because our direct-encoding approach requires a large number of parameters to be determined, and the chance of solution trapped in the local minimum is high. Our studies indicate that fitness measures improved rapidly during the early stages the EC phase, but thereafter improved very slowly once they began to approach a global optimum. With the use of different optimization principles, the PSO phase proved to be very efficient at making kernel-by-kernel position adjustment once a sub-optimum mapping had been established.

Having discussed the EC and PSO phases in detail, we now provide a discussion of an overall method. FIG. 7 is a flow diagram of an illustrative method employing dimensionality reduction. Starting in block 702, the dimensionality reduction system 300 obtains a high dimensionality data set. The system may obtain the data from any number of sources, including logging sensors, a telemetry stream, a stored data file, and a database management system. In block 704, the system determines, based on the size of the data set, whether it is necessary to find sample points representative of the data set via clustering analysis before the EC phase. If clustering is elected, then in block 706 the system applies a clustering algorithm to identify cluster kernels, i.e., a representative data point for each cluster. Certain examples discussed further below employ a multi-resolution graph-based clustering technique as described by Ye and Rabiller in U.S. Pat. No. 6,295,504, but any suitable clustering technique can be used. (See, e.g., "Survey of Clustering Algorithms", IEEE Trans. on Neural Networks, Vol. 16, No. 3, p. 645-678, May 2005.) The (high dimensionality) cluster kernels are then used in place of high dimensionality data set points for subsequent operations.

In block 708, the system determines distances between each pair of samples (i.e., cluster kernels or data points) in the high dimensionality data set. In block 710, the system gets the dimensionality of the low dimensionality data set, the scale (i.e., range) of each axis, and the resolution (i.e., number of bits) for each axis. Typically, these values can be preset or interactively provided by the user of the system. In some embodiments, the system normalizes the range for each of the dimensions of the HD data set (e.g., from −1 to +1) and estimates the range of the LD data space dimensions based on the maximum HD sample-pair distance. (The maximum sample-pair distance in the normalized HD set usually increases with dimensionality.) For example, in some of the experiments described below, the range of each 3D output is set from 0 to 5 with input dimensionality equal to 10 (see Simulated Pulsed Neutron Data Example, where the maximum HD sample pair distance is about 4.9), and set from 0 to 6 with input dimensionality equal to 18 (see Integrated Logging Data Example, wherein the maximum HD sample pair distance is about 6.5). Alternatively, the range of each output can be centralized to zero with positive and negative extension in each side, or set using a fixed setting (0 to 255 for example) when the fitness function is designed to maximize the sample-pair HD-LD distance correlation (rather than maximizing the HD-LD distance match itself) between the input and output space. The number of bits for each output may typically vary from 8 to 16.

In block 712 the system determines the fitness function and evolution parameters, which again can be preset or interactively provided. Illustrative fitness functions include mean square error, where the error is measured as the difference between distances in the high-dimensionality space and the low dimensionality space for each sample pair. Other alternatives include the mean absolute error, or the linear correlation between each sample pair's distances in the high and low dimensionality spaces can be used. With any of these fitness functions, a weighting function may be applied to de-emphasize the error contributions of the widely-spaced sample pairs. In some applications, a multi-objective fitness function may be employed to preserve other properties of the data set in the low-dimensionality data space (e.g., linear correlation with a variable that is to be predicted from the low-dimensionality data points). Other evolutionary parameters that can be specified include population size, mutation probabilities, stopping criteria, and inclusion or exclusion of local ("conditional") evolutionary searches.

In block 714, the evolutionary search technique is applied to obtain an encoding solution as described previously. The initial population is given randomly assigned coordinates. Thereafter, the fitness function is used to rank the population and the "fittest" chromosomes are selected for cross-breeding and mutation.

When local evolutionary searches are enabled, the system attempts to escape local minima by systematically selecting small groups of genes that are allowed to change while the others are held fixed. Restricted cross-breeding and mutation steps are performed on the primary population, but in addition, random encodings for that gene group can be generated to form a secondary population. Each of the resulting chromosomes in the secondary population is evaluated under the fitness function and the best members (also known as "elite members") of the secondary population can be merged with the primary population for the next cycle of breeding and mutation.

Thus the evolutionary search technique assigns each high-dimensionality sample point a corresponding point in low-dimensionality space. The process completes when the assignments adequately satisfy the fitness function. As will be discussed further below, the solution identified by the evolutionary computation process performs adequately, but leaves room for improvement. Consequently, system 300 may follow the evolutionary computation phase with a particle swarm optimization (PSO) phase to refine the solution. In block 716, the system determines the parameters for the PSO phase, either from a stored configuration file or from interactive user input. These parameters can include the number of particles to follow, the form for the velocity and position update calculations, the rate at which particle inertia or energy evolves, and the fitness function. In block 718, the PSO phase is applied to the solution from the evolutionary computation phase, and the globally best position among all of the particles is selected as the optimal low-dimensionality coordinates for each high-dimensionality sample point.

Figure 8:
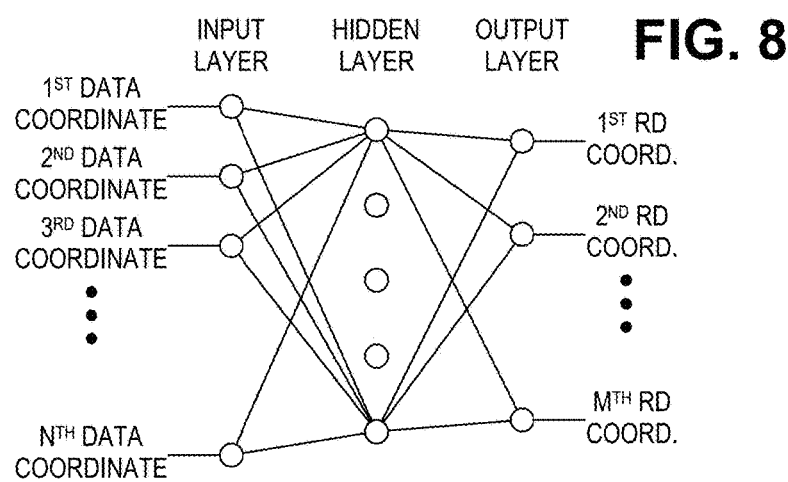
FIG. 8 shows an illustrative neural network for dimensionality reduction.
Figure 5:
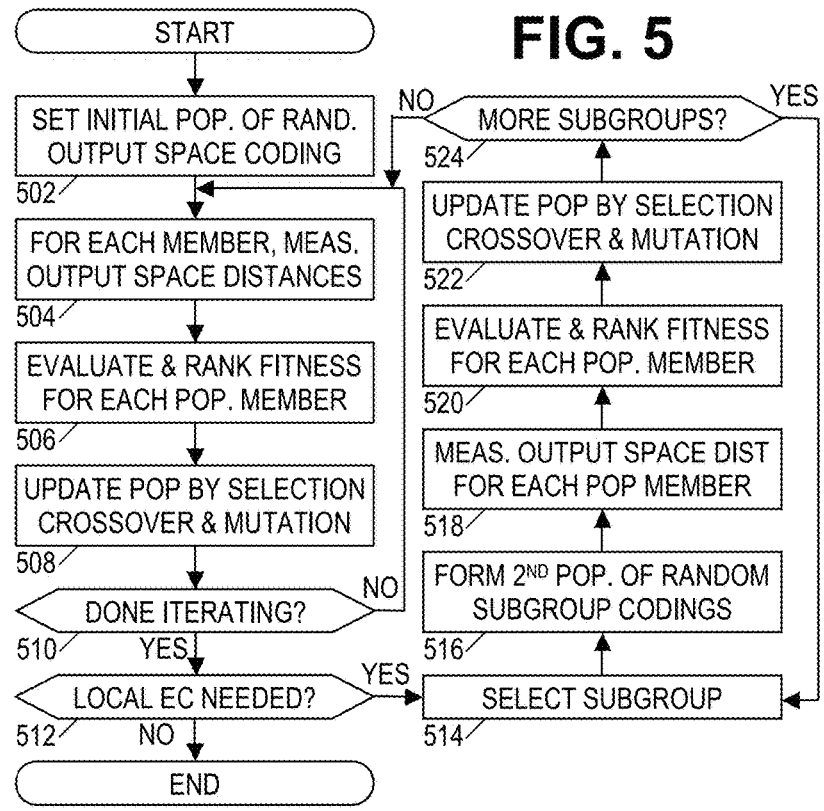
FIG. 5 is a flow diagram of an illustrative evolutionary computation phase.

It is noted here that the solution identified above does not necessary dictate how new or intermediate high-dimensionality data points should be mapped to low-dimensionality coordinates. Accordingly, in block 720 system 300 trains a neural network (such as that shown in FIG. 8) or an ensemble of such neural networks, using as training data the high-dimensionality sample point coordinates as inputs and the corresponding reduced-dimensionality coordinates as outputs. Other interpolation techniques could also be employed, but neural networks offer a robust, generalized answer to this issue. Neural network ensemble design techniques are described in detail by D. Chen, S. Hamid, and H. D. Smith, U.S. Pat. No. 7,280,987, "Genetic algorithm based selection of neural network ensemble for processing well logging data".

In block 722, the system 300 applies the trained neural network ensemble to covert the set of high-dimensionality data points into a set of low-dimensionality data points. The low-dimensionality data set can then be used in a number of potentially advantageous ways. For example, the low-dimensionality data set offers a compressed representation of the high-dimensionality data set which can be used in block 724 to transmitting telemetry information from downhole to the surface. The low-dimensionality data set (particularly when in 2D or 3D) offers a representation that can be readily displayed to a user in block 726. The low-dimensionality data set offers a representation that can serve as the basis for making predictions in block 728 (e.g., predicting formation density or producible oil). The low-dimensionality data set offers a representation that can be used as a basis for decision-making in block 730 (e.g., steering a drillstring or completing a wellbore). In essence, the low-dimensionality data set should preserve the essential information of the high-dimensionality data set accurately enough to enable the low-dimensionality data set to serve as a surrogate for the high-dimensionality data set. When this occurs, the compact and readily-visualizable nature of the low-dimensionality data set greatly facilitates the identification and usage of the information contained within the data set. It is expected that users of the disclosed systems and methods will find them very computationally efficient and suitable for ready integration with existing systems and software to extend their functionality.

Geochemical Data Example

In one illustrative example, the foregoing procedure was applied to whole-rock elemental (geochemical) data obtained from rock samples of three wells. The elemental data was obtained by standard geochemical sample preparation techniques and high-precision measurement on inductively-coupled plasma (ICP) spectrometers. The data set contains about 300 samples, each with about 30 elemental values determined. Nine critical values were derived from the total elemental measurements to determine a chemostratigraphic zonation, with each dimension ranging from −1 to +1. The resulting 9-dimensional data set was taken as the high-dimensionality data set for this example.

In the clustering phase, a basic multi-resolution graph-based clustering (MRGC) method was applied (see Ye and Rabillier), resulting in 39 clusters. (Although clustering is employed in this example for illustrative purposes, it is not strictly necessary for 300 samples.) Note that even for distance-measure-based clustering many variations are allowed here by using different distance functions or choosing transformed dimensionality (first difference or second difference in dimension, for example, for curve-shape matching). The kernel of a cluster could be the mean in each dimension averaged over the samples in the cluster, or the real sample nearest to the calculated mean, or (as in this example) the free attractor as determined in the MRGC method. There were 741 distances calculated in the HD data space between the different kernel pairs.

Two low-dimensionality data spaces were chosen for comparison: a 2D and a 3D space. In each dimension, the range was chosen to be 0-255, with eight-bit resolution and Gray coding. Thus 16 bits per kernel was needed for 2D coding and 24 bits per kernel was needed for 3D coding, resulting in chromosomes of 624 bits and 936 bits, respectively. The initial population size for the EC phase consisted of 50 randomly selected full-length (624 or 936 bits) chromosomes.

Figure 9:
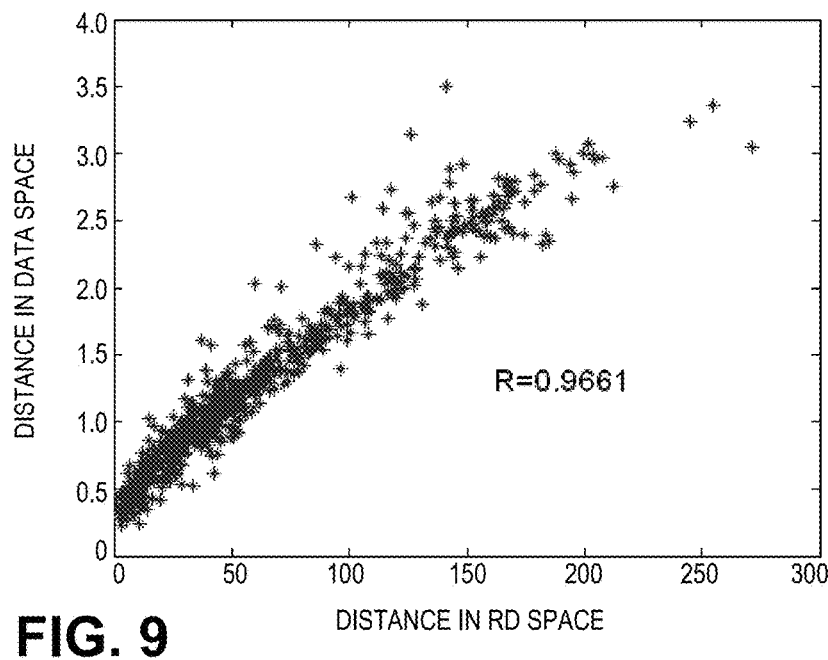
FIGS. 9 and 10 show distance correlation plots for 2D and 3D coding.

The fitness function for this example is the linear correlation between the HD and LD distances. Local searches were not enabled, and the EC phase terminated when no further improvements were observed in the linear correlation. FIG. 9 shows a plot of the distances in the original data set versus distance in the reduced dimensionality data set for the 2D space, and Fig. show shows a similar plot for the 3D space. The linear correlations are R=0.9661 and 0.9847, respectively.

Figure 11:
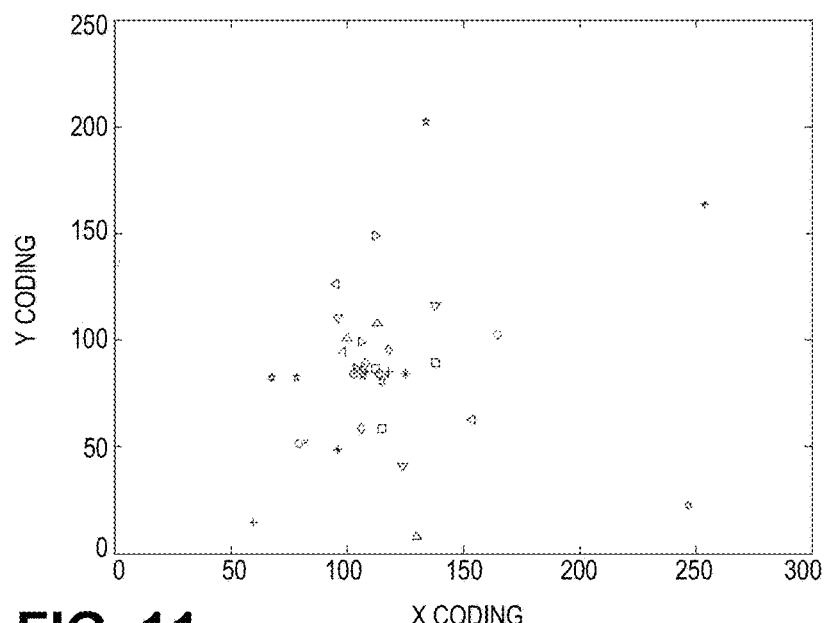
FIGS. 11 and 12 show 2D locations of cluster kernels and data, respectively.
Figure 12:
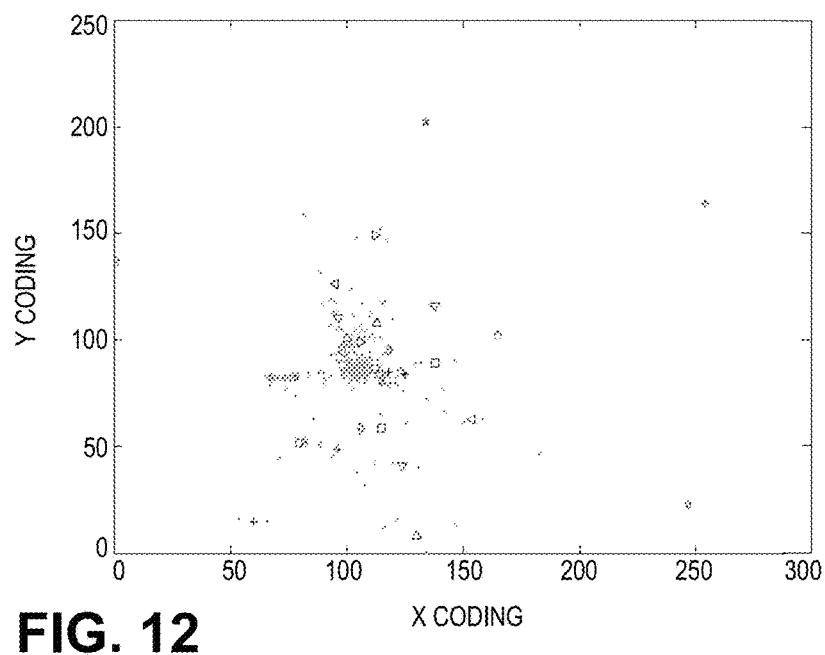
Figure 13:
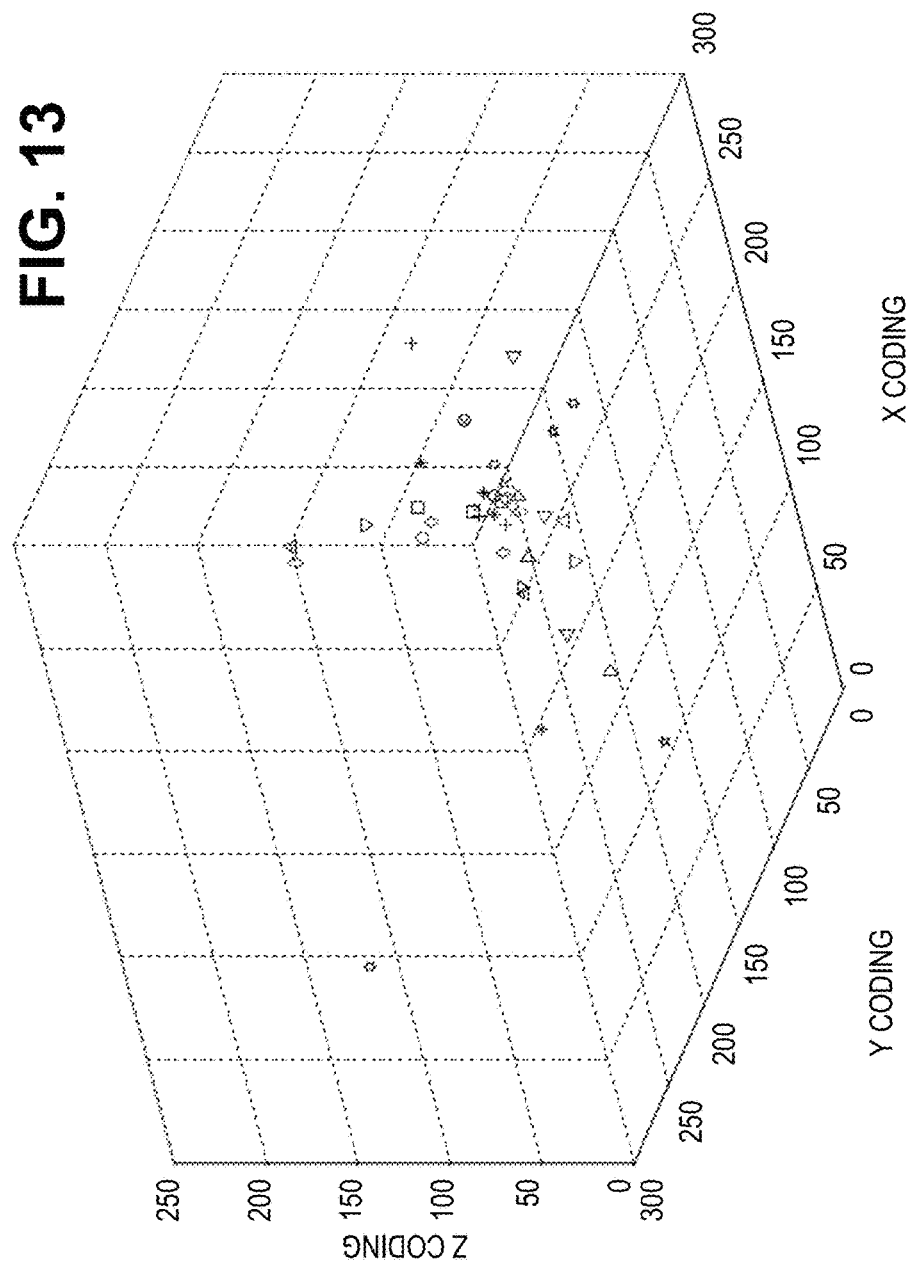
FIGS. 13 and 14 show 3D locations of cluster kernels and data, respectively.
Figure 14:
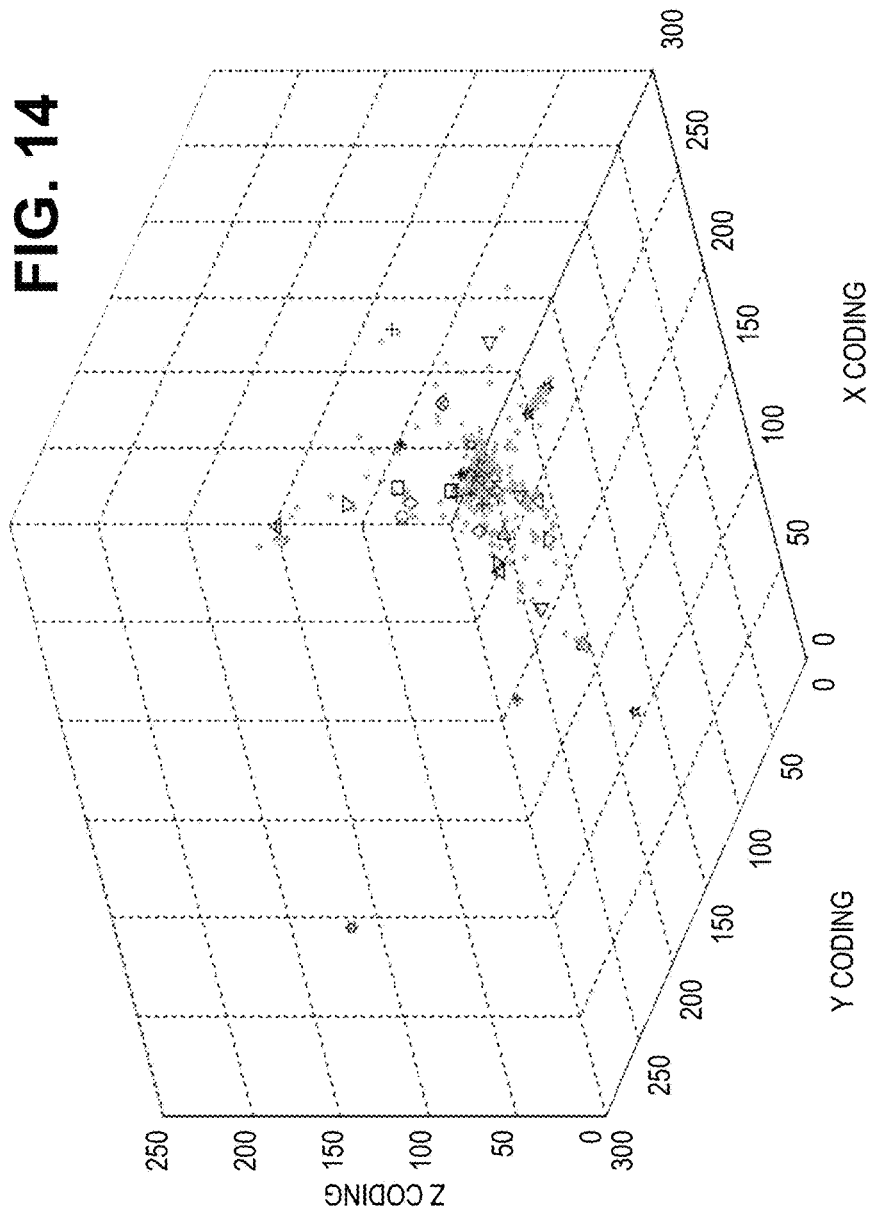

FIG. 11 shows the kernel positions in 2D space as determined by the EC phase. After the kernel positions are refined with PSO and used to train a neural network ensemble, the 2D mapping of the geochemical data set appears as shown in FIG. 12. Similarly, FIG. 13 shows the kernel positions in 3D space as determined by the EC phase, and the 3D mapping of the geochemical data set using a neural network-based conversion model trained on EC optimized kernel positions is shown in FIG. 14.

These plots enable the user to easily relate each cluster to its neighbor clusters. Since information loss is minimized in data transformation with the use of evolutionary optimization and neural network ensemble, the converted cluster kernel and samples will maintain the basic information embedded in the original clusters and samples for subsequent use. Note that the strong correlation between the LD coding and the original clusters may not exist for some data sets, a circumstance that can be determined by visual inspection or by setting adaptable thresholds.

Weighting Functions

Figure 10:
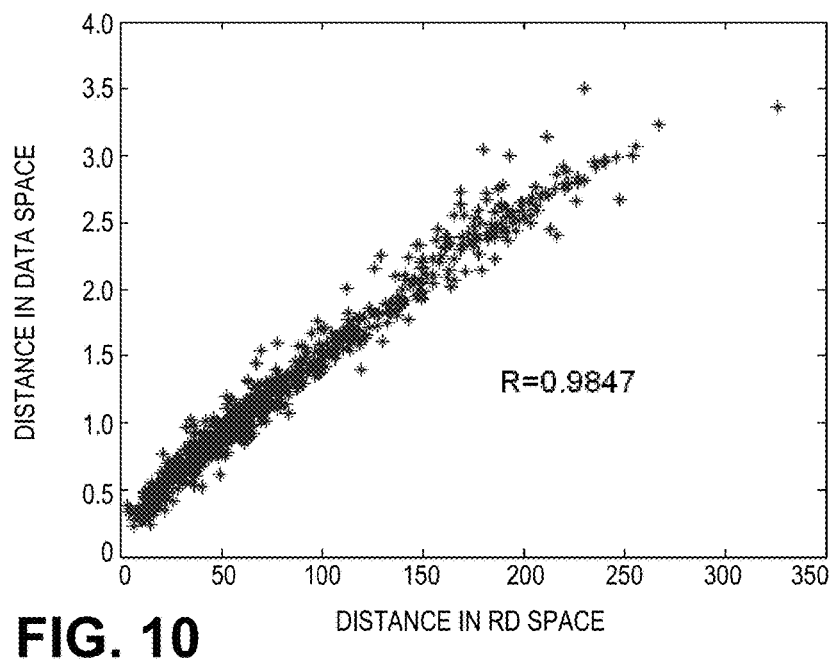
Figure 15:
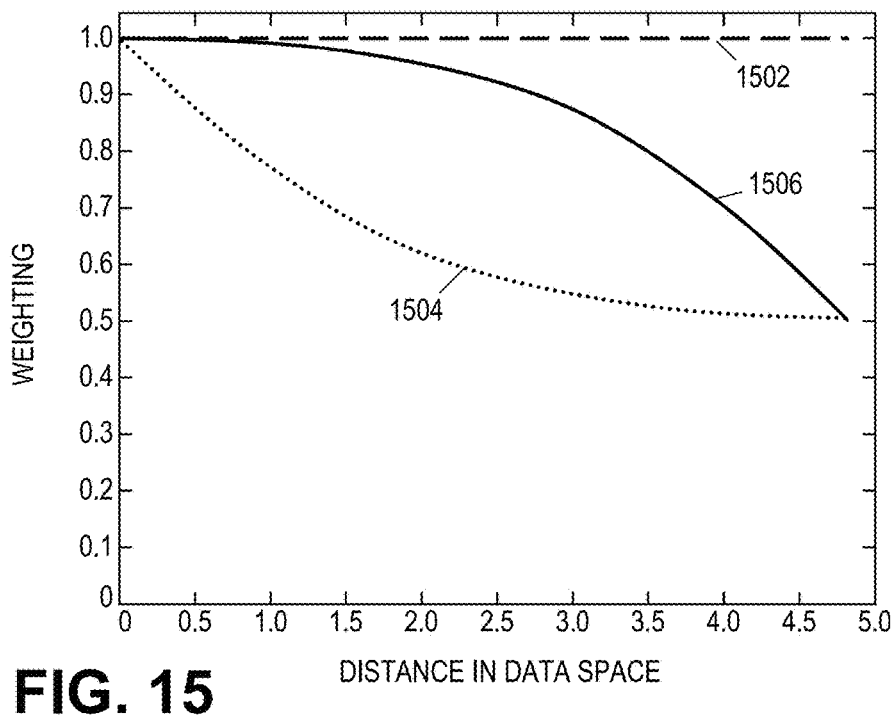
FIG. 15 is a graph of various illustrative weighting functions.

As previously mentioned, one of the primary objectives of the fitness function is to maximize the match of the Euclidian distances between all sample pairs in the original and output data spaces. However, even if the difference between the number of dimensions in the original and output data spaces is only moderate, exact distance matching is most often impossible. The distance crossplots shown in FIGS. 9 and 10 demonstrate that there is plenty of deviation from the ideal. However, preserving the match for short distances may be regarded as more important than long distances. To that end, FIG. 15 illustrates various weighting functions that might be employed in calculating the fitness measurement. Line 1502 represents the uniform, or un-weighted, distance matching objective. Lines 1504 and 1506 de-emphasize the contributions of mismatch errors for sample pairs that are widely spaced in the original data space.

Lines 1504 and 1506 employ a log-sigmoid ("logsig") function to determine the weighting factor associated with the mismatch error for a given sample pair. The logsig function has the form of $a=1/(1+e^{-n})$, where a is the output and n is the input. The weighting function takes the form of $$Wij=\chi\text{-logsig}(Dij-\psi),$$

where $Wij$ is the weighting factor, $Dij$ the distance between sample points i and j in the original data space, and $\chi$, $\psi$ are constants which can be adjusted according to the range of distances found in the original data set. For line 1504, $\chi=1.5$, and $\psi=0$. For line 1506, $\chi=1.0$, and $\psi=4.85$.

In one embodiment, the weighted performance measure can be expressed as:

$$F = \frac{\sum\sum (C \cdot * |A - B|)}{\sum\sum C}$$

wherein F is the fitness function, C is a matrix having elements $Wij$, A is a sample pair distance matrix having elements $Dij$, B is the corresponding sample pair distance matrix in the LD data space, the operator "•*" denotes "multiplication element by element", and the operator of double summation denotes "summation over all rows and columns of a matrix". Other suitable weighting functions for dimensionality reduction can be found in Lespinats et al. (2007), which introduces a symmetric handling of short distance in the original and output spaces, avoiding false neighbor representations while still allowing some necessary tears in the original distribution.

The following example illustrates the effect of employing a weighting function.

Simulated Pulsed Neutron Data Example

In another illustrative example, the disclosed method was applied to open-hole pulsed neutron (PN) logs simulated under different formation and borehole conditions with the Monte Carlo-N-Particle (MCNP) transport algorithm. The high dimensionality data set consists of 441 ten-dimensional samples. The variables making up the dimensions included borehole and formation sigma vales and the primary PN tool responses. The LD space was chosen to have three dimensions with each dimension ranging from 0 to 5.

Figure 16:
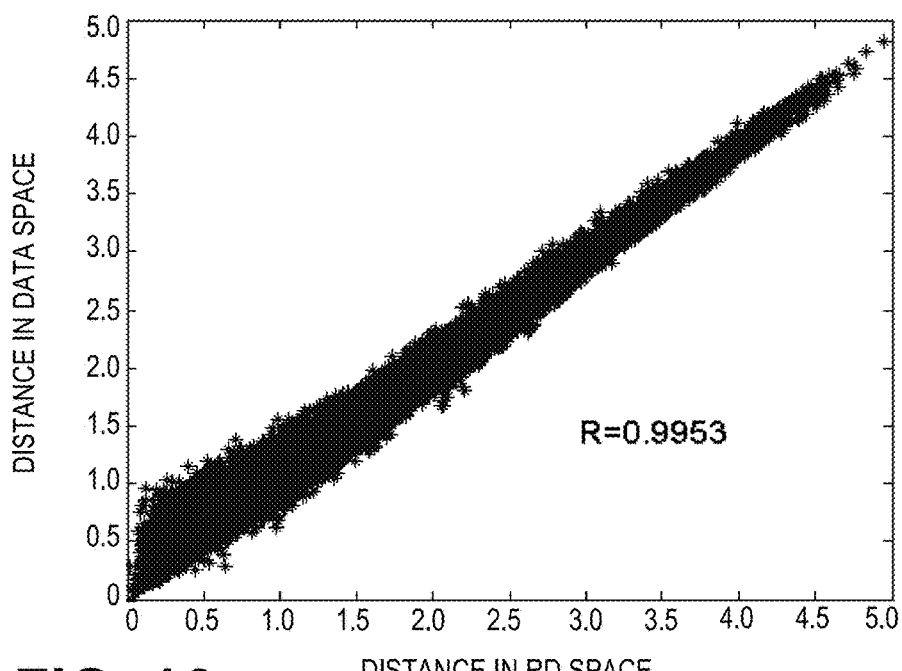
FIGS. 16 and 17 show comparative distance correlation plots for different fitness functions.
Figure 17:
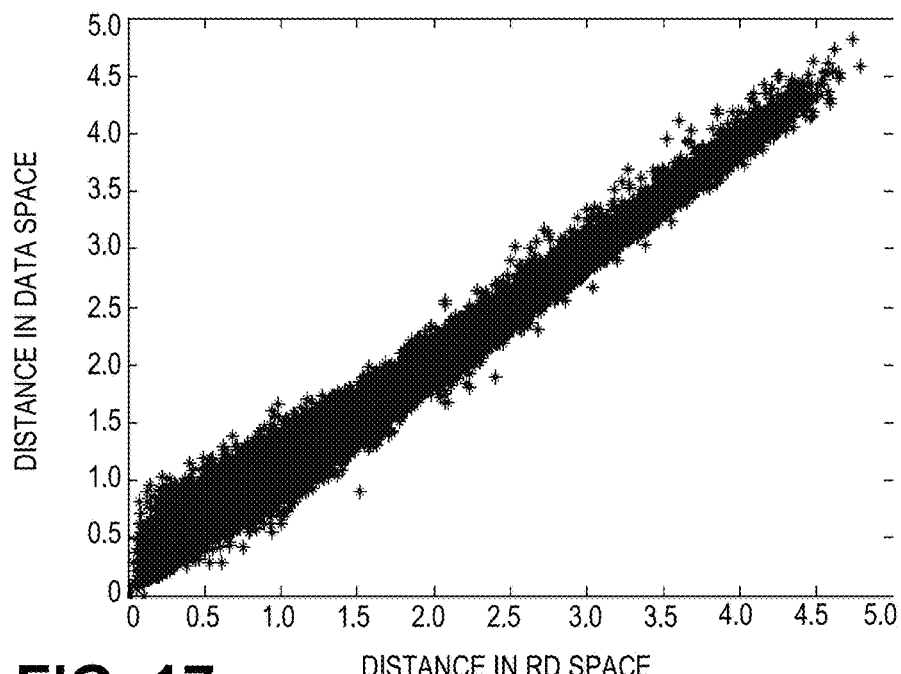

Two fitness functions were employed for comparison: a uniformly weighted (mean) square error (line 1502) and a logsig weighted absolute error (line 1504). EC/PSO cooperative optimization was performed directly on the HD data points (i.e., without clustering). FIG. 16 shows the distance crossplot resulting from the former, while FIG. 17 shows the distance crossplot resulting from the latter. Ideally, the dual-distance points would be less deviated from the diagonals of FIGS. 16 and 17, reflecting perfect distance matches. Too much deviation may indicate significant information loss due to dimension reduction. If that happens, we may need additional coordinates in output space to make more accurate distance mapping. In this experiment, a quality mapping from 10 dimensions to 3 dimensions was achieved, even though the variation of small distance is relatively higher than the variation of larger distance in the mapping space.

Figure 18:
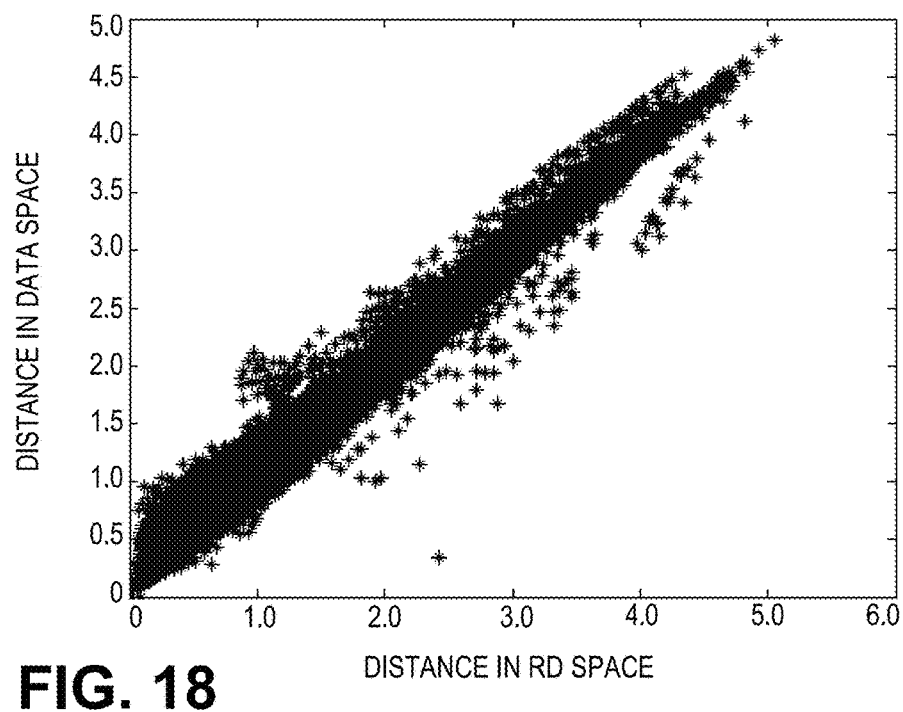
FIGS. 18 and 19 show comparative distance correlation plots before and after particle swarm optimization.
Figure 19:
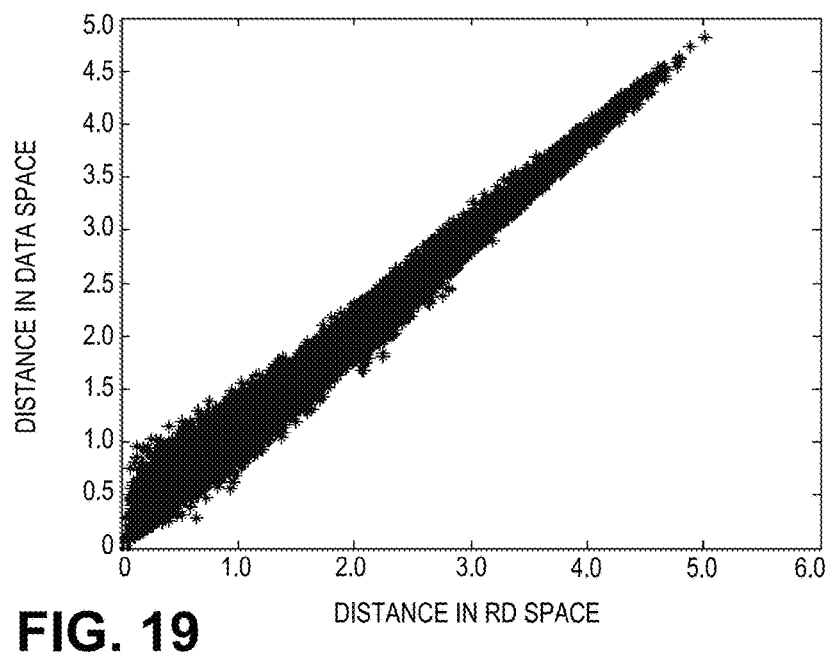

Dual-distance point deviation from the diagonal could also result if the EC search is trapped into a local optimal solution. For example, the crossplot in FIG. 18 illustrates the crossplot that results when the PSO phase is omitted. The crossplot in FIG. 19 shows the improvement that results from applying a final tuning using PSO. A comparison further justifies the use a co-operative tuning method.

Figure 21:
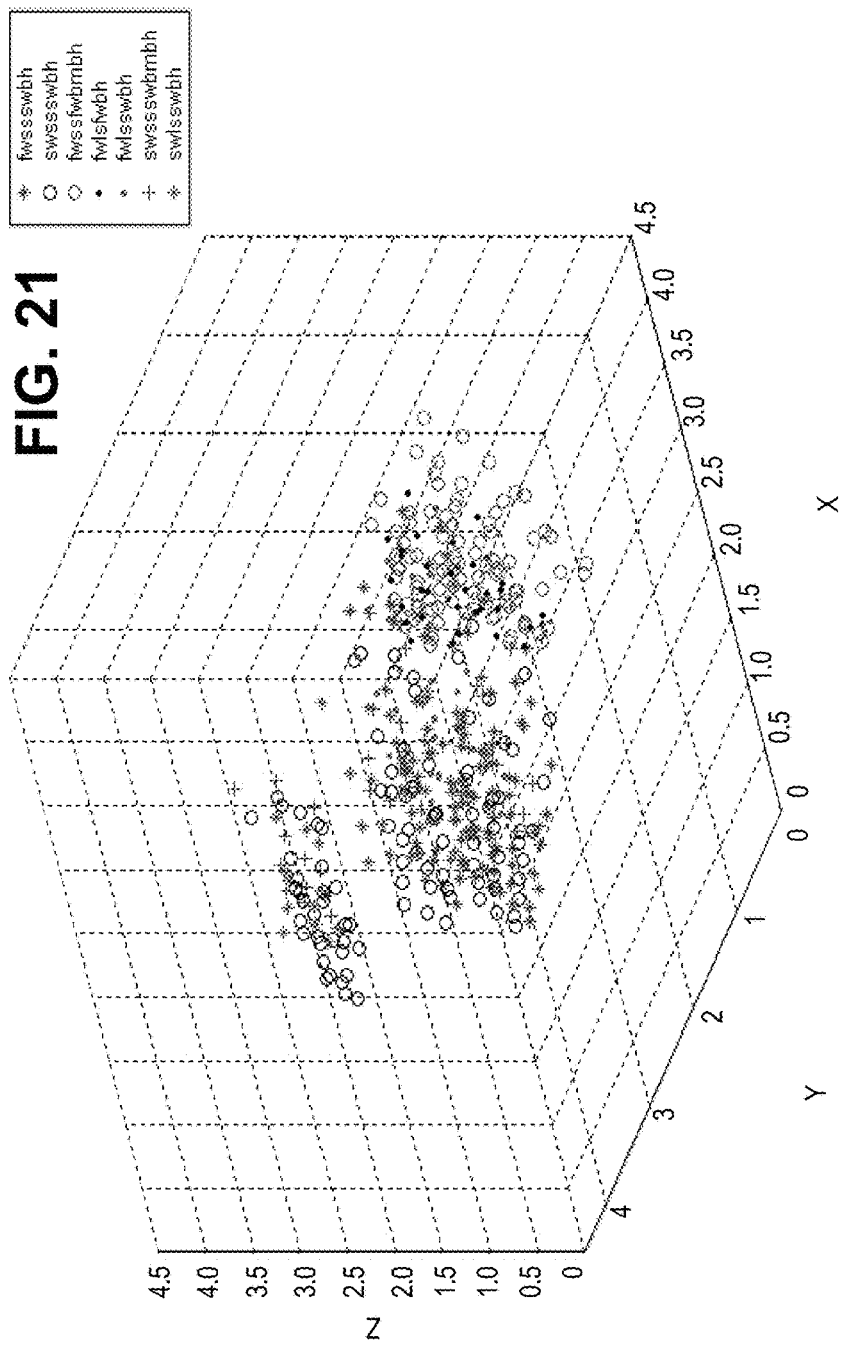
FIG. 21 shows 3D locations of a pulsed neutron (PN) data set.

A visualization of the reduced dimensionality PN data is shown in FIG. 21. The symbol key identifies 7 groups of samples simulated with different formation fluid salinity, formation type, borehole fluid salinity, and borehole barite mud types. In the key, the first two letters (fw or sw) identify the formation fluid (i.e., fresh water or salt water), the second two letters (ss or ls) identify the type of formation (sandstone or limestone), and the third pair of letters (sw, fw, or bm) identify the type of borehole fluid (salt water, fresh water, or barite mud). For example, the data points represented by the black circle have signatures with saltwater in formation fluid, sandstone in formation type, and saltwater in borehole fluid (swssswbh). The data group represented by the red circle was simulated using freshwater as sandstone formation fluid, and also with freshwater and barite mud in borehole (fwssfwbmbh). We can see that these two groups of data are well separated in the 3D output space. The variation in each data group can be explained by borehole size, formation porosity and density, and the stand-off of the tool, which are different from sample to sample. The data of some groups may have some overlap, indicating that the tool response is not very sensitive to those particular formation and borehole parameters. Although perhaps not perfect, the 3D coding of the PN samples in FIG. 21 really preserves the "essential" information of the original high-dimensionality data space, and provides a comprehensive picture of the data base in a direct and vision-friendly manner.

Figure 22:
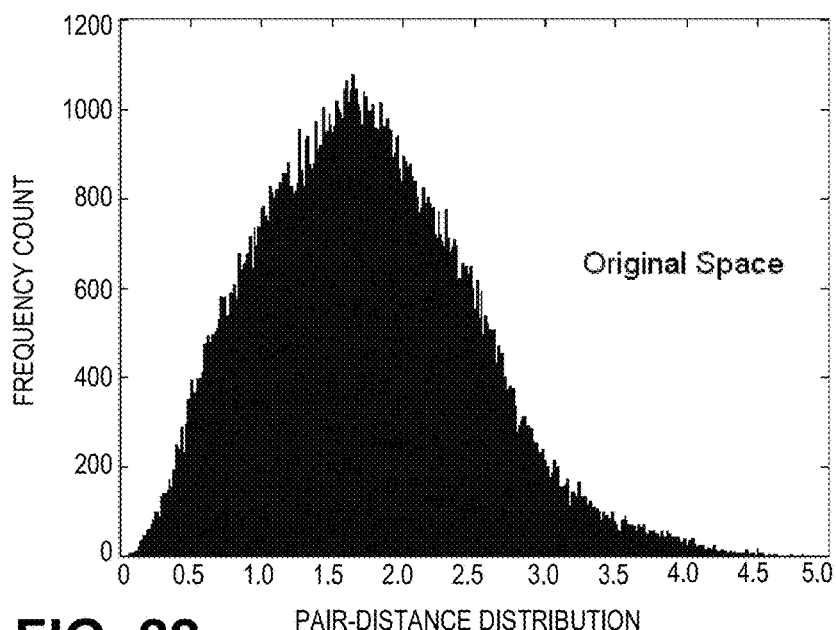
FIGS. 22 and 23 are distance distribution histograms of the PN data in the high- and low-dimensionality spaces, respectively.
Figure 23:
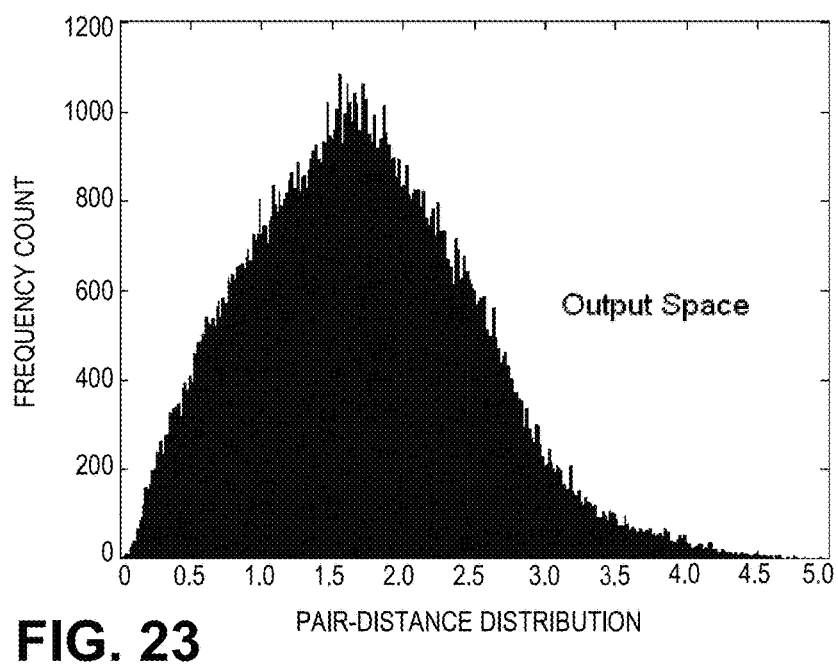

FIG. 22 is a histogram of the distance distribution of all sample pairs in original PN data space. FIG. 23 shows the corresponding distribution in the 3D data space. It can be observed that the histograms have a near perfect match in shape, with both distributions being Gaussian-like with a bit of skew in the tail on the right side.

In addition to helping data visualization and characterization, the systems and methods disclosed herein would also be useful for predictive modeling. Of course, full use of the information presented in the original data space should be considered first for predictive data mining. However, for some applications (e.g., data transmission in a well telemetry system) only limited data are allowed to be transmitted to the surface and used as inputs to predict other unknowns. Since dimension-reduced data can still preserve the essential information of the original data, as described herein, only the reduced data need be transmitted and processed at the surface to make the desired predictions.

To make the predictors more robust, a multi-objective fitness function may be used to determining the best data transformation. In this experiment, for example, we can construct a multi-objective fitness function to minimize the distance mismatch between the original and output space, and to maximize the linear correlation between the output coding and the measured density values in the supervised data set. The first objective helps preserve essential information. The second objective adapts the output to quality density prediction.

Figure 24:
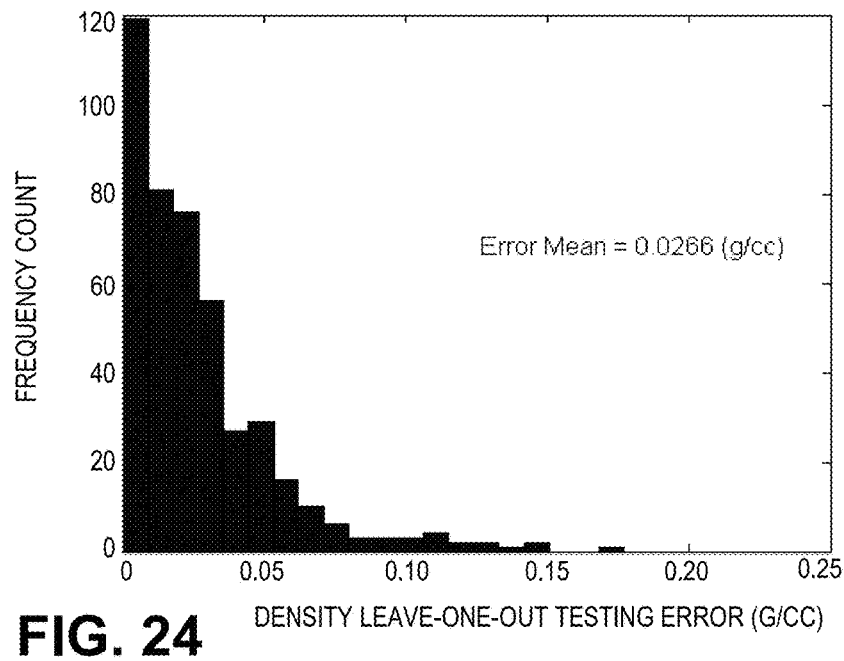
FIGS. 24 and 25 are prediction errors derived from the PN data in the high- and low-dimensionality spaces, respectively.
Figure 25:
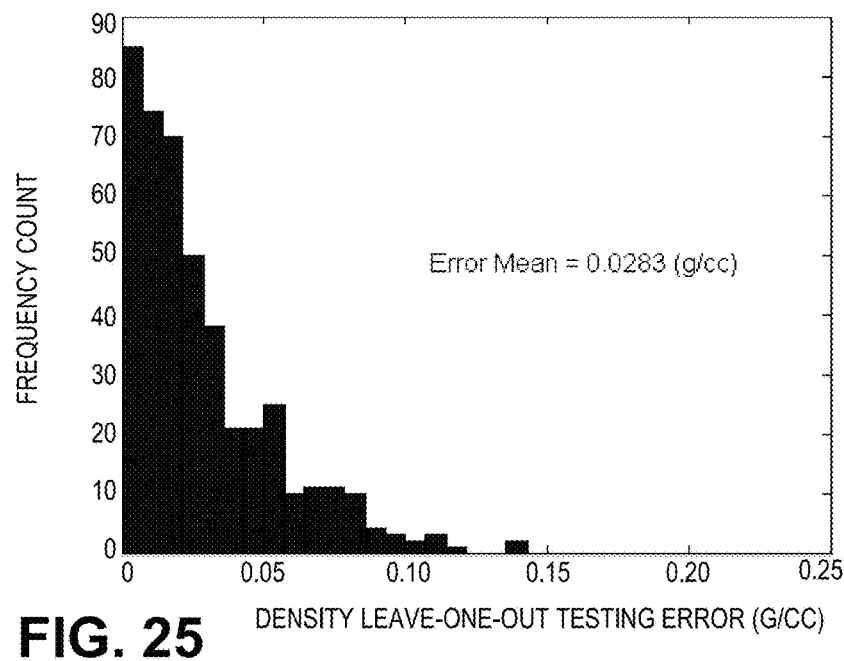

Neural networks were trained to predict density from the original ten-dimensional data set and from the reduced, three dimensional data set. FIGS. 24 and 25 compare the respective density predictabilities. In each case, 441 neural network models were constructed, and the distribution of the leave-one-out testing error is given in FIG. 24 (for the original data set) and in FIG. 25 (for the reduced dimensionality data set). Although using the high-dimensionality data set gives the better density prediction on average, reduced dimensionality data set still produces acceptable predictions. The 3D coding in our method is thus a hybrid non-linear transformation that is more informative than any particular parameter combination with same number of dimensions.

Sedimentary Rock Data Example

In yet another illustrative example, the disclosed methods were applied to whole-rock elemental analyses of 3349 sedimentary rock samples (mostly from oil-well cores) for lithology characterization purposes. The ability to characterize lithology, particularly during the drilling process, is very helpful in locating and exploiting reserves of hydrocarbons and minerals. For each rock sample, 11 measurements (dimensions) were made of the standard geochemical oxides ($SiO_2$, $TiO_2$, $Al_2O_3$, $Fe_2O_3$, MnO, MgO, CaO, $Na_2O$, $K_2O$, $P_2O_5$) plus $SO_3$. The measurements were made on laboratory ICP (inductively coupled plasma) and XRF (X-ray fluorescence) spectrometers. The aim of this experiment was to attempt an objective and quantitative characterization of the range common sedimentary rock types (sandstones, shales, carbonates, anhydrites, halites, phosphorites), as well as soils of extreme geochemical compositions (bauxites and laterites). In addition to data collected from actual samples, several dozen additional data points were used for absolute reference. These consisted of: 1) "ideal" (stoichiometric) compositions of key minerals that compose the theoretical end-member compositions of each general rock type (e.g., quartz, plagioclase feldspar, K-feldspar, calcite, dolomite, anhydrite, halite, fluorapatite, kaolinite, and hematite); 2) compiled averages of various types of sandstone and shale, as published in the scientific literature (Taylor and McLennan 1985, Condie 1993); and 3) compositions of international Geochemical Reference Materials used as laboratory standards for analysis, as published in the scientific literature (Govindaraju 1994).

Figure 26:
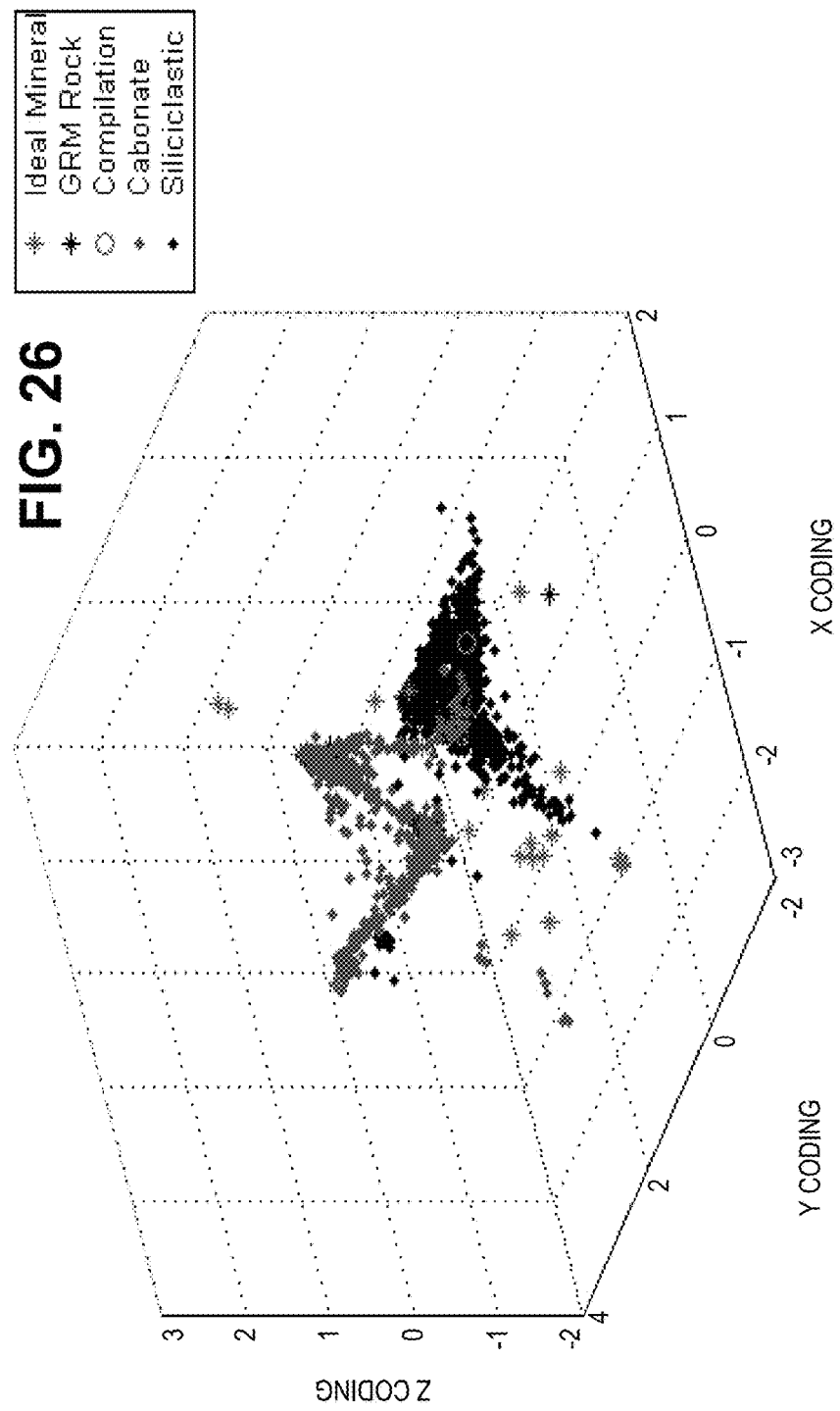
FIGS. 26 and 27 show 3D locations of a geochemical data set derived using different fitness functions.
Figure 27:
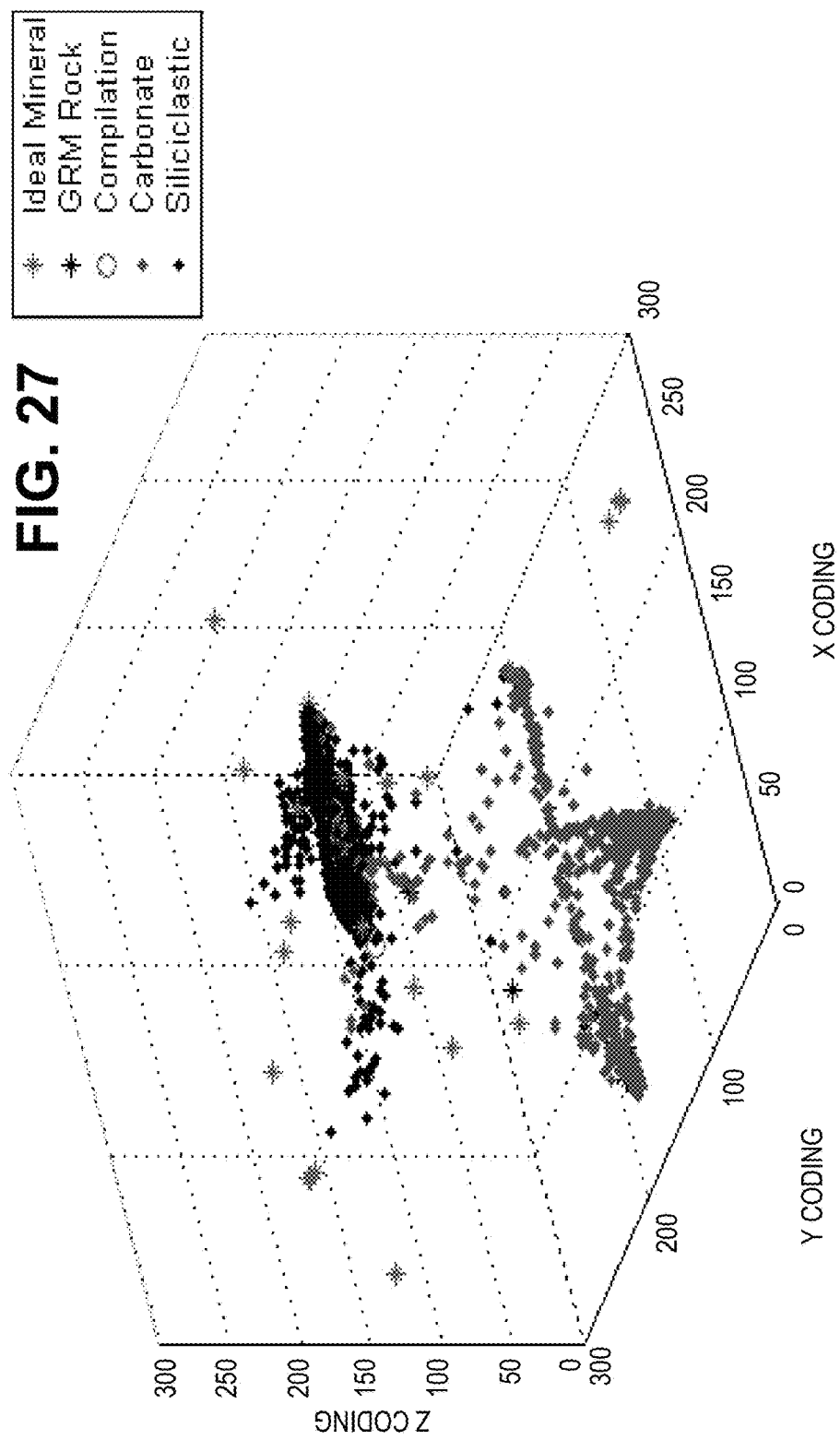

About 250 clusters were generated from the high-dimensionality (HD) data set. A 3-dimensional encoding of the 11-dimensional cluster kernels was determined via EC and PSO. This transform was then used to train a neural network, which was then used to map all of the HD data set to three dimensions. Two fitness functions were used for comparison: mean square error, and linear correlation. FIG. 26 shows a data visualization derived using the former, whereas FIG. 27 shows a data visualization derived using the latter.

In both cases, the major lithological types are clearly discriminated in the 3D plots. The two dominant groups of sedimentary rocks, siliciclastics and carbonates, make up the two most prominent "clouds" in the low-dimensionality data space. The spatial extent of these clouds encompasses the continuum of compositions for these rocks. For siliciclastics, the continuum ranges from nearly pure quartz sandstones to clay-rich shales. For carbonates, it spans the continuum between limestone and dolostone. The "filaments" that extend outward from the two primary clouds are lithologies transitional to the less common sedimentary rock types, i.e., anhydrite evaporites (high $SO_3$), halite evaporates (high $Na_2O$ and Cl), phosphorites (high $P_2O_5$), bauxitic soils (high $Al_2O_3$), and ironstones or lateritic soils (high $Fe_2O_3$). Finally, the most extreme compositions possible in this space, defined by the pure mineral end-members (e.g., quartz, kaolinite, calcite, dolomite, apatite, hematite, etc.), form the expected "cage" that encloses all of the clouds defined by the measured whole-rock data.

Previous visual characterization methods for sedimentary rock can employ as many as four or five ternary diagrams. The disclosed dimensionality reduction approach may enable every sedimentary rock sample (i.e., rock composition) to be described by a single (X,Y,Z) coordinate point in the visualization space. The important implication here is that, all sedimentary rocks could potentially be uniquely, objectively, and quantitatively characterized by just the three coordinates. This potentially enables universal characterization and comparison of lithologies for a variety of geological and petrophysical purposes. Moreover, the integrated solution method provided herein may enable rapid discrimination of sedimentary rock types while drilling on-site.

Integrated Logging Data Example

In still yet another illustrative example, the disclosed methods were applied to logging data acquired from a first ("training") well to form a visualization transform that was then successfully applied to visualize data from a second ("application") well. The input data set from the training well consisted of about 5500 high-dimensionality samples spanning 2750 ft of well depth. Each sample had 18 variables, including LWD measurements (rate of penetration, caliper, gamma ray, shallow, medium and deep resistivity with different excitation frequencies) and cased-hole pulsed neutron measurements (including both count-rate-based primary parameters and ratio-based secondary parameters). Each variable in the HD data space is typically normalized in the range from −1 to 1. Approximately 400 clusters were identified in the clustering phase, and the cluster kernels were positioned in a 3D output data space via EC/PSO with a mean-square error fitness function. A neural network ensemble was trained to model the dimensionality reduction transform, and was thereafter used to map all high-dimensionality data to the 3D output data space.

Figure 20:
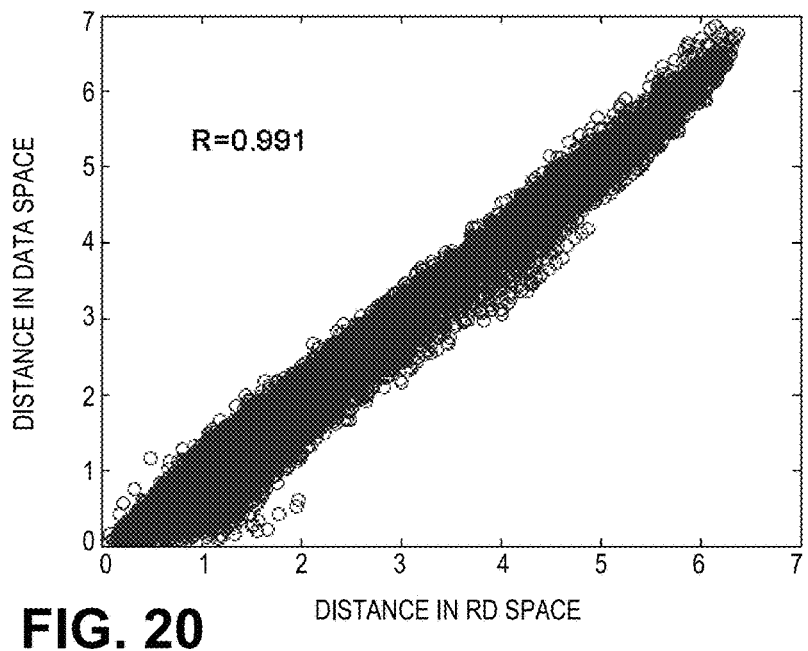
FIG. 20 shows a distance correlation plot for an integrated logging data set.

FIG. 20 shows the input and output data space sample-pair distance correlation of the training well data. Although noisy data were used in this study, high correlation between 18D and 3D sample-pair distances can still be observed. Compared with the previous simulated ten-dimensional PN data example, the mean-squared-error over all sample-pair distances has increased from 0.008 to 0.022 for the eighteen-dimensional field data.

Figure 28:
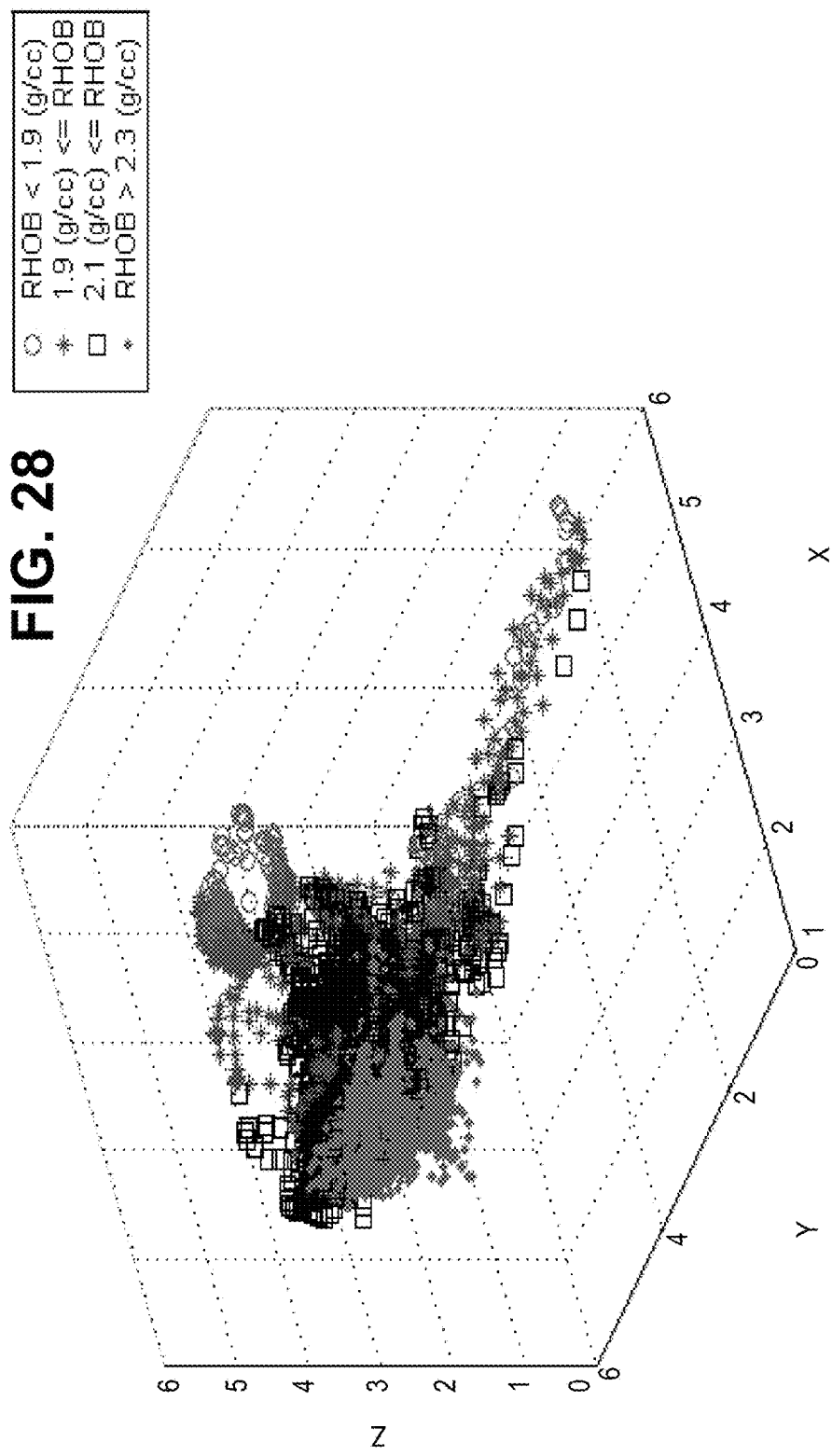
FIG. 28 shows 3D locations of integrated logging data from a training well.
Figure 29:
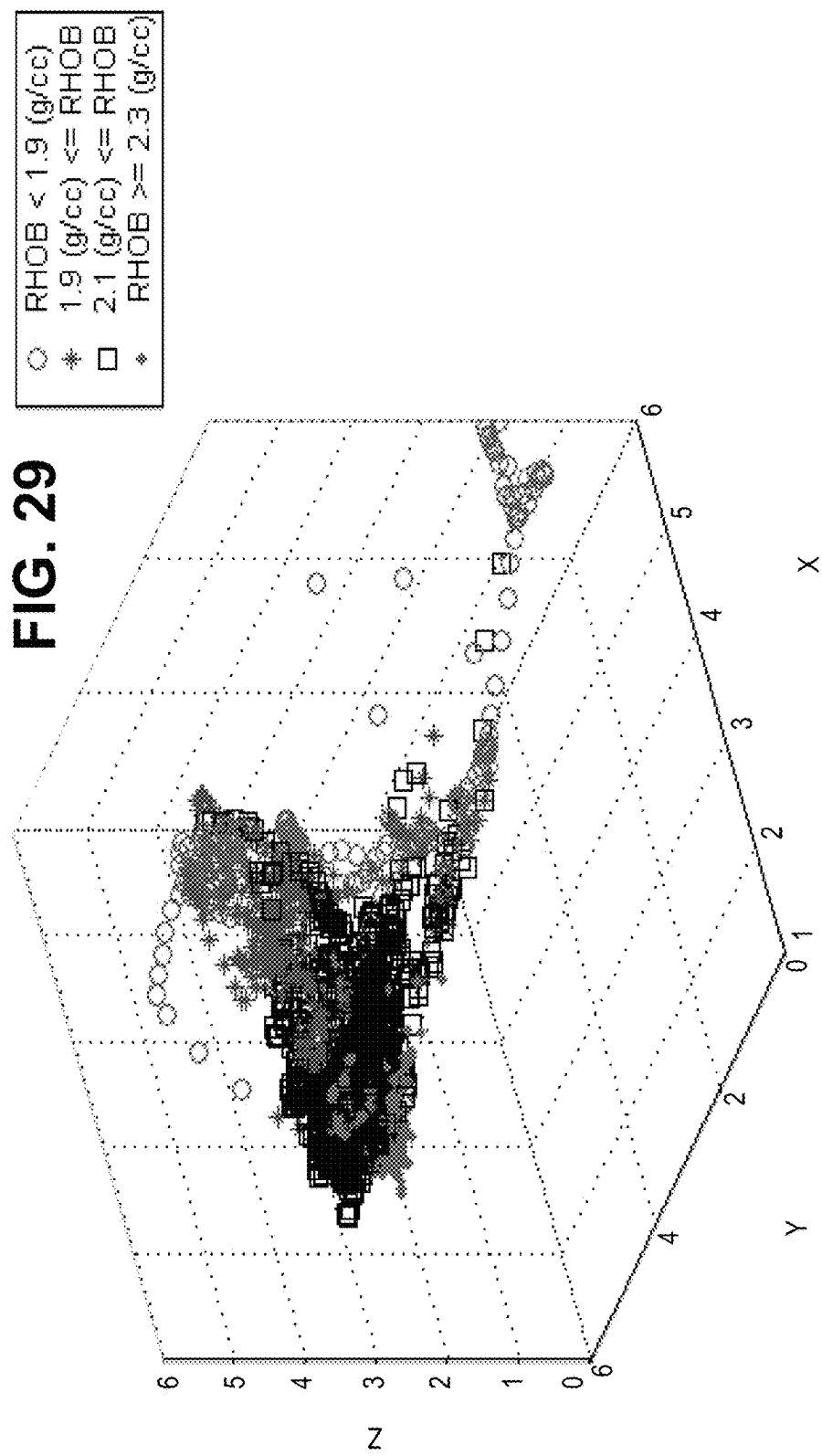
FIG. 29 shows 3D locations of integrated logging data taken from an application well.

FIG. 28 shows the three dimensional visualization of the training well data. As indicated by the symbol key, the training well data has been categorized into formation (bulk) density ranges of <1.9, 1.9-2.1, 2.1-2.3, and >2.3 grams per cubic centimeter. (Bulk density was excluded from the HD data set.) It can be observed that the points in a given bulk density range are fairly well segregated in the diagram. The application data set includes 3150 samples spanning 1575 ft of well depth. FIG. 29 shows the three dimensional visualization for the application well data. In this figure, the segregation is even more pronounced.

Figure 30:
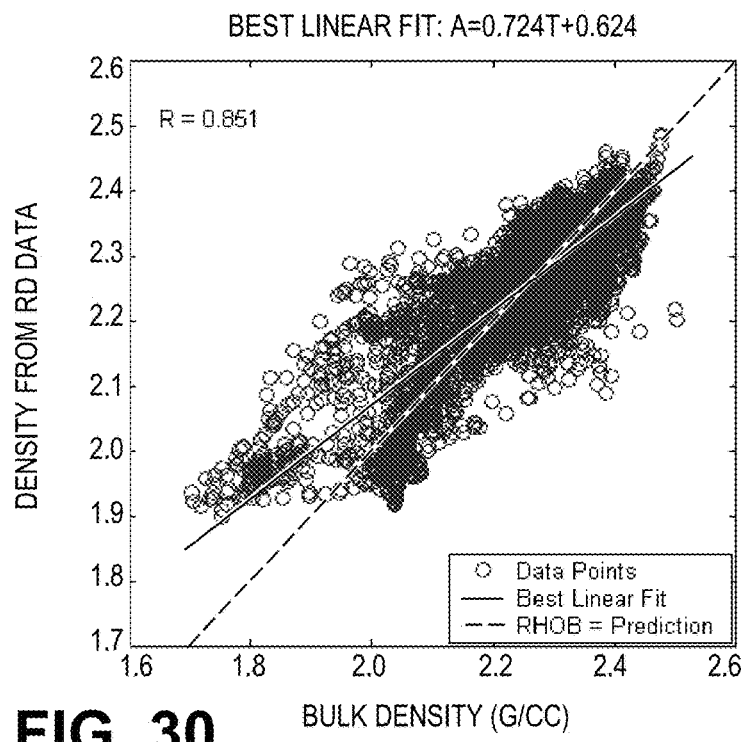
FIGS. 30 and 31 show density correlations with the integrated logging data taken from the training and application wells, respectively.
Figure 31:
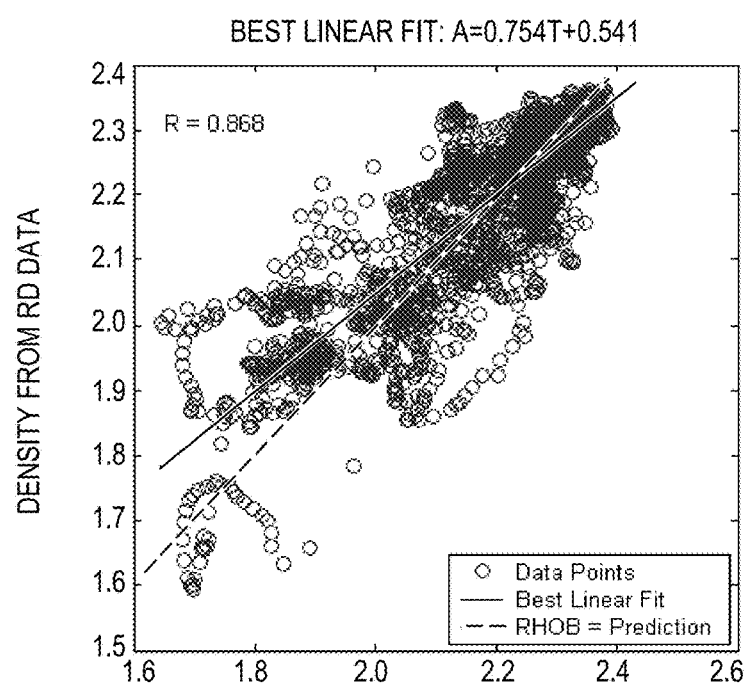

As one of the objectives provided in the fitness function, we expected to see the transformed 3D data would preserve the correlation with formation density as "essential information". The linear correlation coefficient of the original 18D inputs and bulk density is 0.8990 for the training well and 0.9026 for the application well. FIGS. 30 and 31 illustrate that the 3D transformed data still preserves a high linear correlation with bulk density up to 0.851 for the training well and 0.868 for the application well.

Note that in this example, we did not include multi-objective components during output positioning optimization. Mean-squared-error in sample-pair distance was the only performance measure applied to the integrated logging data. Since the dimensionality reduction information loss was not significant, it could be an advantage to use the 3D outputs in this case for further data analysis, such as non-linear predictive modeling, lithology identification and reservoir characterization.

Discussion of Illustrative Applications

In the foregoing examples, the disclosed dimensionality reduction systems and methods have been applied for chemostratigraphic zonation from elemental rock data, borehole environment classification and density prediction from simulated (open-hole) pulsed neutron data, sedimentary rock classification from geochemical oxide measurements, and to obtain a transferable dimensionality reduction transform for integrated logging data. The disclosed techniques could be used equally well on many other kinds of complex compositional data in many fields of science, engineering, and technology, with numerous commercial applications. Some illustrative examples include fingerprinting various substances to identify their source and potential issues associated with those substances.

Hydrocarbons are one such substance. Standard laboratory analyses of hydrocarbons provide organic compound composition; elemental H, C, N, O and S content; trace element content (especially, V, Ni, S, and other metals); and stable isotope composition of H, C, and O. The resulting high-dimensionality data set is difficult to comprehend. If dimensionality reduction can produce a readily-comprehensible (X,Y,Z) data set similar to that demonstrated above for sedimentary rock samples, a very powerful fingerprinting technique could be established. This (X,Y,Z) fingerprint may be a superior way of characterizing hydrocarbons in the subsurface to assess reservoir continuity, extent of mixing between oils in a given reservoir; thermal maturity of the oil source, etc. This fingerprint would be useful to guide exploration and production programs, and to assessing any problematic aspects of oils for transportation (e.g., asphaltene precipitation) and refining (combinations of V, Ni, S, Fe, etc. which are detrimental to catalysts in refineries).

Other substances suitable for fingerprinting include kerogens and bitumens in hydrocarbon source rocks. These substances have much of the same readily-obtainable characteristics as those outlined for hydrocarbons above. Analyses of kerogen and bitumen are done routinely and are relatively inexpensive, allowing for economical generation of abundant input data. The reduced dimensionality coordinates would serve as fingerprints having utility in upstream exploration and development programs in much the same way as the hydrocarbon fingerprints.

The collective flow properties of reservoir rocks can be fingerprinted. Laboratory measurements of porosity, permeability, MICP (mercury injection capillary pressure) curves, relative permeability, image analysis of pore size/shape from thin section microscopy and SEM (scanning electron microscopy), inter alia, would provide a high-dimensionality characterization of reservoir quality or aquifer quality (i.e., measures of the rock's ability to store or transmit water, oil, or natural gas). The reduced dimensionality fingerprint would be of great use in planning drilling programs for oil and gas recovery from the subsurface.

Fingerprinting of subsurface sedimentary rock can be performed using among other things, petrophysical log data, chemostratigraphic data (elemental and isotope), mineralogical data, and organic geochemistry data. Such fingerprinting would, among other things, facilitate characterizing sedimentary facies in terms of the original depositional environment of the sediment that now comprises the sedimentary rock. The fingerprints of rocks in reservoir layers would enable a better understanding of the spatial distribution and volume of reservoirs, and be of great value in planning and drilling of development wells, especially horizontal development wells.

Similarly, igneous rock can be fingerprinted to facilitate identifying characteristics such as the lithology, the source volcano(s) of a volcanic ash bed (where ash has been transported in the atmosphere and has settled some distance from the volcano), the volcano or underground source location from which volcanic lava rock was generated or erupted, the tectonic setting in which the magma was generated in the subsurface, the degree of fractional crystallization undergone by the magma during its emplacement and cooling to form a solid rock, and the degree of contamination added to the magma by surrounding rock. Such characteristics would be helpful to locating and exploiting reserves of metal and mineral ores.

Water produced from subsurface aquifers can be fingerprinted using standard laboratory water analyses as the high-dimensionality input data set. As with other substances, the fingerprints would be useful in identifying sources, distribution, etc., for drilling and production planning. Organic and inorganic pollutants in soils and aquifers can similarly be fingerprinted from laboratory analyses to enable tracing, source identification, and remediation planning. Materials commonly employed in criminal forensic investigations can be fingerprinted from compositional analyses. Examples include soils, paints, concretes, papers, plastics, metal alloys, glass, residual fluids, biological specimens, and DNA. In such investigations, the fingerprints would simplify tracing and source identification.

Indeed, many high-dimensionality data sets should be amenable to dimensionality reduction to enhance understanding and use of the information inherent in that data. Users seeking the most suitable clustering method for many problems may find that task considerably simplified when working in the low-dimensionality data space, since the results after coding will be less sensitive to the particular clustering algorithms. The refining of a given clustering scheme via cluster merging/splitting also becomes much more convenient in the 2D or 3D spaces.

In addition to the performance benefits realized via direct EC encoding of the LD coordinates coupled with PSO refinement of those coordinates, the disclosed methods and systems are expected to exhibit improved performance relative to existing dimensionality reduction techniques through the use of an additional supervised term into the fitness function. (Usually this term would be the correlation of the output coding with the parameters to be predicted.) The introduced term is user-defined and may vary depending on the intended use of the low-dimensionality data set.

The disclosed systems and methods are suitable for automating data mining of HD data, thereby requiring less specialist manpower. They are suitable for high-ratio data compression with minimal information loss, thereby enhancing efficiency of data transmission in a well telemetry system. They may further ease or eliminate input selection for predictive modeling. Numerous variations and modifications will become apparent to those skilled in the art once the above disclosure is fully appreciated.

Though the methods disclosed herein have been shown and described in a sequential fashion, at least some of the various illustrated operations may occur concurrently or in a different sequence, with possible repetition. For example, in some embodiments the PSO phase may be followed by a conversion of the PSO results into binary strings for a subsequent EC phase. It is intended that the following claims be interpreted to embrace all such variations and modifications.

The following references are helpful to understanding the foregoing disclosure and are hereby incorporated herein by reference:

1. Beygelzimer, A., et al. 2003. System and methods for using continuous optimization for ordering categorical data sets. U.S. Pat. No. 6,615,211.
2. Chakraborti, N., Mishra, P., and Erkoc, S. 2004. A study of the Cu clusters using gray-coded genetic algorithms and differential evolution. Journal of Phase Equilibria and Diffusion, vol. 25, no. 1, p 16-21.
3. Chen, D., Quirein, J. A., Smith, H., Hamid, S., and Grable, J. 2005. Neural Network Ensemble Selection Using a Multi-Objective Genetic Algorithm in Processing Pulsed Neutron Data. Petrophysics 46 (5): 323-334.
4. Chen, D., Zhong, A., Hamid, S., DeJesus, O., and Stephenson, S. 2007. Construction of Surrogate Model Ensembles with Sparse Data. Proc., World Congress on Evolutionary Computation, Singapore, 244-251.
5. Chen, D., et al. 2007. Genetic algorithm based selection of neural network ensemble for processing well logging data. U.S. Pat. No. 7,280,987
6. Condie, K. C. 1993. Chemical Composition and Evolution of the Upper Continental Crust: Contrasting Results from Surface Samples and Shales. Chemical Geology, 104 (1-4): 1-37.
7. Demartines, P. and Herault, J. 1997. Curvilinear Component Analysis: A Self-Organizing Neural Network for Nonlinear Mapping of Data Sets. IEEE Trans. Neural Networks 8 (1): 148-154.
8. Fruchterman, T., and Reingold, E. 1991. Graph Drawing by Force-Directed Placement. Software: Practice and Experience 21 (11): 1129-1164.
9. Govindaraju, K. 1994. Compilation of Working Values and Sample Description for 383 Geostandards. Geostandards Newsletter 18 (Special Issue): 1-158.
10. Lespinats, S., Verleysen, M., Giron, A., and Fertil, B. 2007. DD-HDS: A Method for Visualization and Exploration of High-Dimensional Data. IEEE Trans. Neural Networks 18 (5): 1265-1279.
11. Lowe, D. and Tipping, M. 1996. Feed-Forward Neural Networks and Topographic Mappings for Exploratory Data Analysis. Neural Computing & Applications 4 (2): 83-95.
12. Quirein, J. A., Smith, H., Chen, D., Perkins, T., Reed, S., and Jacobson, L. 2005. Formation Density Prediction Using Pulsed Neutron Capture Tools. Trans., SPWLA 46th Annual Logging Symposium, New Orleans, paper QQ.
13. Raymer, M., Punch, W., Goodman, E., Kuhn, L., and Jain, A. 2000. Dimensionality Reduction Using Genetic Algorithms. IEEE Transactions on Evolutionary Computation 4 (2): 164-171.
14. Rui, X. and Wunsch, D., II 2005. Survey of Clustering Algorithms. IEEE Trans. on Neural Networks, Vol. 16, No. 3, p. 645-678.
15. Sammon, J. W. 1969. A Nonlinear Mapping for Data Structure Analysis. IEEE Trans. Comput. C-18 (5): 401-409.
16. Schwanke, R. W., and Hanson, S. J. 1995. Method for modeling similarity function using neural networks. U.S. Pat. No. 5,461,698
17. Taylor, S. R. and McLennan, S. M. 1985. The Continental Crust: Its Composition and Evolution. Oxford, United Kingdom: Blackwell Scientific Publications.
18. Yang, C., Tu, C., Chang, J., Liu, H., and Ko, P. 2006. Dimensionality Reduction Using GA-PSO. Proc., 9th Joint Conference on Information Sciences, Taiwan, http://www.atlantis-press.com/php/download_paper.php?id=130.
19. Ye, S. J., and Rabiller, P. 2001. Multi-resolution graph-based clustering. U.S. Pat. No. 6,295,504.

What is claimed is:

1. A substance fingerprinting method that comprises:
performing a compositional analysis on a sample of a substance;
obtaining a data set of compositional analysis results having a dimensionality that is to be reduced;
generating a population of chromosomes having encoded low-dimensionality coordinates for data set members;
subjecting said population of chromosomes to evolutionary computation to generate new chromosomes and corresponding low-dimensionality coordinates for data set members based on a fitness function until a threshold fitness level or predetermined number of iterations is reached, wherein the new chromosomes are used to select a dimensionality reduction mapping;
applying the dimensionality reduction mapping to the compositional analysis results to obtain a low-dimensionality representation, wherein a distance between two data points in the obtained data set to be reduced is substantially maintained in the low-dimensionality representation;
using the low-dimensionality representation to match the sample with one or more closely-related substances; and
identifying one or more characteristics of the sample based on properties of the closely-related substances.

2. The method of claim 1, further comprising deriving the dimensionality reduction transform from the data set, wherein said deriving includes:
identifying kernels that represent clusters within the data set;
applying evolutionary computation to directly-encoded low-dimensionality coordinates for the kernels to select a bit-restricted initial encoding;
refining the initial encoding using a local search technique that is not bit-restricted; and
training at least one neural network to implement the dimensionality reduction transform based on the refined encoding.

3. The method of claim 2, wherein the local search technique employs particle swarm optimization.

4. The method of claim 2, wherein the substance is sedimentary rock, and wherein said one or more characteristics include one or more of the following: lithology; sedimentary facies in terms of original depositional environment; reservoir quality; and aquifer quality.

5. The method of claim 2, wherein the substance is igneous rock, and wherein said one or more characteristics include one or more of the following: lithology; source volcano(s) of a volcanic ash bed included in the igneous rock; source location of volcanic lava from which the igneous rock originated; tectonic setting in which magma making up the igneous rock was generated; degree of fractional crystallization undergone by magma during its emplacement and cooling to form the igneous rock; degree of contamination added by surrounding rock to magma making up the igneous rock.

6. The method of claim 2, wherein identifying one or more characteristics includes identifying a source and distribution of the substance.

7. The method of claim 6, wherein the substance is in the set consisting of hydrocarbons, kerogens, bitumens, water, water pollutants, and soil pollutants.

8. A well-telemetry method that comprises:
obtaining a data set having a dimensionality that is to be reduced;
generating a population of chromosomes having encoded low-dimensionality coordinates for data set members;
subjecting said population of chromosomes to evolutionary computation to generate new chromosomes and corresponding low-dimensionality coordinates for data set members based on a fitness function until a threshold fitness level or predetermined number of iterations is reached, wherein the new chromosomes are used to select a dimensionality reduction mapping;
training a neural network ensemble with the dimensionality reduction mapping, wherein a distance between two data points in the obtained data set to be reduced is substantially maintained in the dimensionality reduction mapping;
configuring a downhole processor to apply the neural network ensemble to logging data to obtain reduced-dimension telemetry data for transmission uphole;
generating predictions of one or more formation properties based on the telemetry data; and
adjusting a steering mode of a downhole tool using the predictions of the one or more formation properties.

9. The method of claim 8, wherein the evolutionary computation employs a multi-objective fitness function with a measure of kernel pair distance error and a measure of linear correlation with a prediction variable.

10. The method of claim 8, wherein the dimensionality reduction mapping is refined by particle swarm optimization.

* * * * *